US005405232A

United States Patent [19]

Lloyd et al.

[11] Patent Number: 5,405,232

[45] Date of Patent: Apr. 11, 1995

[54] AUTOMATIC STORAGE AND RETRIEVAL SYSTEM

[75] Inventors: Kurt M. Lloyd, Pewaukee; Christopher L. Roth, West Allis, both of Wis.; LaMar A. Jones, Sandy, Utah; Billy R. Jackson, North Salt Lake, Utah; James P. Hrica, Sandy, Utah; Dennis G. Hueman, New Berlin, Wis.; Rodney O. Kirby, Bountiful, Utah

[73] Assignee: Harnischfeger Engineers, Inc., Brookfield, Wis.

[21] Appl. No.: 42,418

[22] Filed: Apr. 2, 1993

Related U.S. Application Data

[63] Continuation-in-part of Ser. No. 886,133, May 20, 1992.

[51] Int. Cl.[6] .................................. B65G 1/00

[52] U.S. Cl. .................................. 414/280; 414/282; 414/922

[58] Field of Search .............. 414/277, 280, 281, 282, 414/922

[56] References Cited

U.S. PATENT DOCUMENTS 2,669,365 2/1954 Gourdon .
3,638,575 2/1972 Griner .
3,759,381 9/1973 Mercadie et al. .
3,782,565 1/1974 Doran et al. .................... 414/277 X
3,884,370 5/1975 Bradshaw et al. .
4,352,622 10/1982 Wieschel ............................ 414/277
4,361,411 11/1982 Di Liddo ............................ 414/277
4,549,841 10/1985 Ishige ................................ 414/282
4,595,332 6/1986 Loomer ......................... 414/282 X
4,712,864 12/1987 Van Elten et al. .
4,722,653 2/1988 Williams et al. .
4,756,657 7/1988 Kinney .
4,773,807 9/1988 Kroll et al. .
4,963,251 10/1990 Bohm et al. .
5,044,859 9/1991 Sorensen et al. .
5,059,079 10/1991 Foulke et al. .................. 414/277 X

FOREIGN PATENT DOCUMENTS 0241189 10/1987 European Pat. Off. .
0329642 8/1989 European Pat. Off. .
1547586 9/1967 France .
2630412 10/1989 France .
1235560 9/1967 Germany .
2002749 7/1971 Germany .
2313429 6/1974 Germany .
2130186 5/1984 United Kingdom .

*Primary Examiner*—Robert P. Olszewski
*Assistant Examiner*—Dean A. Reichard
*Attorney, Agent, or Firm*—Michael, Best & Friedrich

[57] ABSTRACT

A storage and retrieval machine comprising a base adapted to move horizontally along a supporting surface, a generally vertical mast supported by the base, a carriage supported for generally vertical movement along the mast, and an extendable and retractable shuttle mechanism supported by the carriage, the shuttle mechanism including an upper plate fixed against horizontal movement relative to the carriage, an intermediate plate which is located below the upper plate and which is supported by the upper plate for horizontal movement relative thereto, a lower plate which is located below the intermediate plate and which is supported by the intermediate plate for horizontal movement relative thereto, and hoops on the lower plate for selectively engaging a load, the shuttle mechanism being operable between a retracted condition wherein the intermediate plate is located directly below the upper plate and the lower plate is located directly below the intermediate plate, and an extended condition wherein the intermediate plate extends outwardly in one direction relative to the upper plate and the lower plate extends outwardly in the one direction relative to the intermediate plate.

47 Claims, 14 Drawing Sheets

150
634
638
602
620
650
652
98
114
118
186B
664
618
622
46
610
660
186A
122

122
186A
660
604
612
664
620
644
614
608
118
186B
602
114
632
636
648
640
150
98

AUTOMATIC STORAGE AND RETRIEVAL SYSTEM

CROSS REFERENCE TO RELATED APPLICATION

This is a continuation-in-part of co-pending application Ser. No. 886,133, filed May 20, 1992, and entitled MODULAR SYSTEM FOR AUTOMATICALLY STAGING LETTERS IN CONNECTION WITH A LETTER SORTING MACHINE.

FIELD OF THE INVENTION

The invention relates to letter sorting systems, such as systems employed by the United States Postal Service. The invention also relates to automatic storage and retrieval systems.

BACKGROUND OF THE INVENTION

The United States Postal Service employs many types of letter sorting machines. Some examples are bar code sorters, optical character readers, multiple position letter sorters and delivery bar code sorters. Such letter sorting machines are well known to those skilled in the art, and these machines will therefore not be described in greater detail.

The operation of these machines is currently quite labor intensive. Letters are generally conveyed to and from letter sorting machines in trays which are in turn conveyed in relatively large carts that are moved by hand. This requires a significant amount of labor, and the carts take up a significant amount of floor space. Two-pass delivery bar code sorters also require staging or storing of letters between passes. Such staging is currently done with the same trays and carts, resulting in the same disadvantages.

Many letter sorting machines are modular, i.e., their capacity can be increased or decreased by adding or removing modular units.

SUMMARY OF THE INVENTION

The invention provides a modular system for automatically staging or storing trays of letters for input to a letter sorting machine and for automatically staging letters dispensed by a letter sorting machine. The invention also provides an improved automatic storage and retrieval machine.

The system can be used in connection with any type of letter sorting machine. When used in connection with a two-pass delivery bar code sorter, the system also automatically presents letter trays in proper order for the second pass, automatically stages letters from the letter sorting machine after the second pass, and automatically presents letter trays in proper order for conveyance after the second pass.

The system is modular, so it can be tailored to a letter sorting machine of virtually any size. The modular nature of the system enables relatively quick installation of the system in existing facilities. The system can be fit within various types of building layouts and can be interfaced with various delivery and take-away systems. The system can be located close to a letter sorting machine so that relatively little labor is required to move letters from the sorting machine to the system. The system takes advantage of available vertical air space and requires a minimum amount of floor space. The height of the system can be varied to take advantage of existing overhead clearance. The system provides faster and more accurate staging than can be done manually.

Overall, the system provides substantial floor space savings, substantial capital cost savings, and substantial labor savings.

Specifically, the system comprises, along with a letter sorting machine, an automatic storage and retrieval system. The automatic storage and retrieval system includes a staging or storage rack and a storage and retrieval machine which is positioned to receive letter trays from the sorting machine and to present letter trays for input to the sorting machine and which is operable to stage letter trays in and retrieve letter trays from the staging rack. The staging rack is modular and includes a number of discrete modules each providing several levels and bays of staging locations, such that the number of staging locations can be varied by varying the number of modules. The modules are arranged end-to-end, so that the length of the system can be adapted to the length of the letter sorting machine. The staging locations of the staging rack are by design provided by cantilevered shelves. Because the shelves are cantilevered, there are no partitions between adjacent staging locations. This affords a maximum number of staging locations in a given space.

The storage racks used in connection with prior art storage and retrieval machines must be specially designed to accommodate a shuttle mechanism or extractor. For example, if the rack includes shelves defining the storage locations, those shelves must be discontinuous or otherwise specially configured to permit placement of the extractor plate beneath a stored object. A further disadvantage associated with prior art storage and retrieval machines is the need to lift objects on and off the storage rack. This requires the mechanism for supporting the extractor plate to be of a heavy, durable construction, and to be carefully maintained. The extractor of the present invention avoids the foregoing disadvantages.

The storage and retrieval machine provided by the invention includes a mast movable horizontally adjacent the staging rack, a carriage movable vertically relative to the mast, and an extractor movable relative to the carriage for placing letter trays in and extracting letter trays from the staging rack. The carriage and extractor assembly differs from known assemblies in that, among other things, it has been specifically adapted for handling letter trays. Rather than extending below and picking up the object to be moved (the letter tray), the extractor of the present invention extends above a letter tray and pulls or slides the letter tray onto the carriage. This permits the extractor to be more lightly constructed and supported than prior art extractors. The extractor includes two hoop-like mechanisms that swing down and engage or capture the letter tray, and the combination of the hoop-like mechanisms and the location of the extractor immediately above the letter tray substantially prevents letters from coming out of the letter tray while the storage and retrieval machine is moving the letter tray. Movement of the hoop-like mechanisms is actuated by one or more motors.

More particularly, the extractor includes one or more plate members that are supported for horizontal extension and retraction relative to the carriage. The plate members include an uppermost plate member that is stationary with respect to the carriage, and one or more successively lower plate members that are each preferably slideably supported with respect to the preceding plate member. When extended, the plate members extend outwardly in the same direction and in generally cantilevered relation to each other. The number of plate members used can be varied to change the length of extension of the extractor. When in the retracted condition, the plate members are aligned in generally vertically stacked relation within the carriage so that they do not interfere with movement of the carriage. Suitable moving means, such as an electric motor on the carriage or on the uppermost plate member, is provided to move the plate members between extended and retracted positions.

When used in conjunction with a two-pass delivery bar code sorter (DBCS), the system also comprises a sweep rack on each side of the DBCS. Each sweep rack provides, for each output stacker of the DBCS on the same side of the DBCS, a respective letter tray staging position. The sweep racks are located such that an operator (a sweep operator) can easily move or "sweep" letters from an output stacker to the associated letter tray supported by the sweep rack. The sweep racks are, like the staging rack, modular. The staging rack and the storage and retrieval machine are located on one side of the DBCS, and the sweep rack on that side of the DBCS (the near-side sweep rack) is located beneath the staging rack. By design, the modules of the sweep rack are the same length as the modules of the staging rack, and each staging rack module is mounted on top of a respective sweep rack module.

The system also comprises an input tray transport system or conveyor for transporting or conveying letter trays from the opposite-side sweep rack to the storage and retrieval machine. This tray transport system also conveys trays from the near-side sweep rack to the storage and retrieval machine. The tray transport system is by design horseshoe-shaped and runs through the opposite-side sweep rack, around the end of the DBCS, and through the near-side sweep rack. The tray transport system terminates adjacent the station of the DBCS feed operator. The tray transport system is located in the sweep racks such that a sweep operator can easily place trays from either sweep rack onto the tray transport system. The tray transport system is accessible by the storage and retrieval machine at a point near the downstream end of the tray transport system, i.e., at the end of the near-side sweep rack. All letter trays from the opposite-side sweep rack are conveyed to either the feed operator or the storage and retrieval machine by the tray transport system.

The system also comprises, in the near-side sweep rack, output belts or conveyors for carrying letter trays to the feed operator. Each output belt is aligned with and located behind an associated level of staging positions in the near-side sweep rack, such that the sweep operator can push letter trays from any one of the staging positions onto the associated output belt. The downstream end of each output belt is located adjacent the feed operator station, and each output belt is accessible adjacent its downstream end by the storage and retrieval machine.

The operation of the system with a two-pass DBCS will be described only generally at this point. A more detailed description follows.

Letter trays coming to the DBCS are placed on the upstream end of the input tray transport system. Many of these letter trays are staged by the storage and retrieval machine, and the remainder of the letter trays are retrieved by the storage and retrieval machine and placed on one of the output belts to be delivered to the feed operator. After the trays on the input tray transport system have been delivered to the feed operator, the storage and retrieval machine delivers the trays in the staging rack to the feed operator.

During and after first pass, the sweep operator places letters from each output stacker into the associated letter tray in the associated sweep rack. The letter tray carries a bar code identifying the associated DBCS output stacker. Full letter trays are placed on the input tray transport system for transport to the storage and retrieval machine. When first pass has ended, letter trays remaining on the opposite-side sweep rack are placed on the input tray transport system for transport to the storage and retrieval machine, and letter trays remaining in the near-side sweep rack are pushed onto the output belts for transport to the feed operator.

As the system presents letter trays to the feed operator for second pass, the system insures that all filled trays that were placed on the input tray transport system are presented to the feed operator in proper sequence. Operation during second pass is similar to operation during first pass. After second pass, letter trays are staged for subsequent conveyance rather than for another pass through the DBCS.

Thus, the invention provides a letter sorting apparatus including a letter sorting machine having means for receiving letters to be sorted, means for sorting letters, and means for dispensing sorted letters. The letter sorting apparatus also includes means separate from the letter sorting machine for automatically staging letters from the dispensing means.

The invention also provides a letter sorting apparatus including a letter sorting machine having means for receiving letters to be sorted, means for sorting letters, and means for dispensing sorted letters. The letter sorting apparatus also includes means separate from the letter sorting machine for automatically staging letters for input to the receiving means.

The invention also provides a letter sorting apparatus including a letter sorting machine that has means for receiving letters to be sorted and means for sorting letters. The letter sorting apparatus also includes an automatic storage and retrieval system including means defining a plurality of storage locations, and a storage and retrieval machine. The storage and retrieval machine is positioned to receive letters from the sorting means and to present letters for input to the receiving means, and is operable to store letters in and retrieve letters from the storage locations.

The invention also provides a letter sorting apparatus including a letter sorting machine which has two sides and which includes means for receiving letters to be sorted, means for sorting letters, and means on both of the sides for dispensing sorted letters. The letter sorting apparatus also includes an automatic storage and retrieval system including means defining a plurality of staging locations, and a storage and retrieval machine operable to stage letters in and retrieve letters from the staging locations. The letter sorting apparatus further includes first staging means adjacent one of the sides of the letter sorting machine for staging letters from the sorting means, the staging means including means defining a plurality of staging positions, means for transporting letters from the first staging means to the storage and retrieval machine, the transporting means including a transport system located adjacent the staging positions such that an operator can push letter receptacles from the staging positions onto the transport system, second staging means adjacent the other side of the letter sorting machine for staging letters from the sorting means, and means for transporting letters from the second staging means to the storage and retrieval machine.

The invention also provides an automatic storage and retrieval system including means defining a plurality of storage locations, a storage and retrieval machine operable to store objects in and retrieve objects from the storage locations, storing means defining a plurality of storage positions, and means for conveying objects from the storing means to the storage and retrieval machine. The conveying means includes a conveyor located adjacent the storage positions such that an operator can push objects from the storage positions onto the conveyor.

The invention also provides an automatic storage and retrieval system including storing means defining a plurality of storage positions, means defining a plurality of storage locations above the storage positions, a storage and retrieval machine operable to store objects in and retrieve objects from the storage locations, and means for conveying objects from the storing means to the storage and retrieval machine.

The invention also provides an automatic storage and retrieval system including one or more discrete modules each defining a plurality of storage locations, such that the number of storage locations can be varied by varying the number of the modules, and a storage and retrieval machine. The storage and retrieval machine is operable to store objects in and retrieve objects from the storage locations.

The invention also provides a method of handling letters being sorted by a letter sorting machine. The method includes the steps of providing an automatic storage and retrieval system including means defining a plurality of staging locations, and a storage and retrieval machine, transporting letters from the sorting machine to the storage and retrieval machine, and operating the storage and retrieval machine to stage letters in and retrieve letters from the staging locations.

The invention also provides a method of handling letters being sorted by a letter sorting machine. The method includes the steps of providing an automatic storage and retrieval system including means defining a plurality of staging locations, and a storage and retrieval machine, transporting letters to the storage and retrieval machine, and operating the storage and retrieval machine to stage letters in and retrieve letters from the staging locations and to stage letters for input to the receiving means.

The invention also provides a letter sorting apparatus including a letter sorting machine having means for receiving letters to be sorted, means for sorting letters, and means for dispensing sorted letters. The letter sorting apparatus also includes an automatic storage and retrieval system for automatically staging letters from the dispensing means, the system including a storage rack, the storage rack including a shelf having a continuous upwardly facing surface defining a plurality of storage locations, and a storage and retrieval machine. The storage and retrieval machine is positioned to receive letters from the dispensing means, and includes a base adapted to move horizontally along a supporting surface and an extendable and retractable shuttle mechanism supported by the base for placing letters in and removing letters from the storage locations.

The invention also provides a storage and retrieval machine including a base adapted to move horizontally along a supporting surface, a generally vertical mast supported by the base, a carriage supported for generally vertical movement along the mast, and an extendable and retractable shuttle or extractor mechanism supported by the carriage. The extractor includes an upper plate fixed against horizontal movement relative to the carriage, an intermediate plate which is located below the upper plate and which is supported by the upper plate for horizontal movement relative thereto, and a lower plate which is located below the intermediate plate and which is supported by the intermediate plate for horizontal movement relative thereto. The shuttle mechanism is operable between a retracted condition wherein the intermediate plate is located directly below the upper plate and the lower plate is located directly below the intermediate plate, and an extended condition wherein the intermediate plate extends outwardly in one direction relative to the upper plate and the lower plate extends outwardly in the one direction relative to the intermediate plate.

The invention also provides a storage and retrieval machine including a base moveable horizontally along a supporting surface, a generally vertical mast supported by the base, a carriage supported for generally vertical movement along the mast, and shuttle means for sliding a load onto and off the carriage without exerting an upward force on the load.

The invention also provides an automatic storage and retrieval system including a storage rack having a shelf with a continuous upwardly facing surface defining a plurality of storage locations, and a storage and retrieval machine. The storage and retrieval machine includes a base moveable horizontally along a supporting surface, and an extendable and retractable shuttle or extractor mechanism supported by the base for placing objects in and removing objects from the storage locations.

The invention also provides a storage and retrieval machine including a base moveable horizontally along a supporting surface, a generally vertical mast supported by the base, a carriage supported for generally vertical movement along the mast, and an extendable and retractable shuttle or extractor mechanism supported by the carriage. The extractor includes a plate-like member movable horizontally relative to the carriage, a first motor for moving the member relative to the carriage, a second member movable relative to the plate-like member for engaging an object to be moved by the extractor, and a second motor for moving the second member relative to the plate-like member.

The invention further provides a storage and retrieval machine including a base moveable horizontally along a supporting surface, a generally vertical mast supported by the base, a carriage supported for generally vertical movement along the mast, and an extendable and retractable shuttle or extractor mechanism supported by the carriage. The extractor includes a plate movable horizontally relative to the carriage, and means on the plate for selectively engaging an object so that the object moves horizontally with the plate, the means for selectively engaging the object including a member movable relative to the plate between an upper position and a lower position.

Other features and advantages of the invention will become apparent to those skilled in the art upon review of the following detailed description, claims and drawings.

DESCRIPTION OF THE DRAWINGS

FIG. 7 is a left side elevational view of the carriage and extractor assembly shown in FIG. 6.

Figure 1:
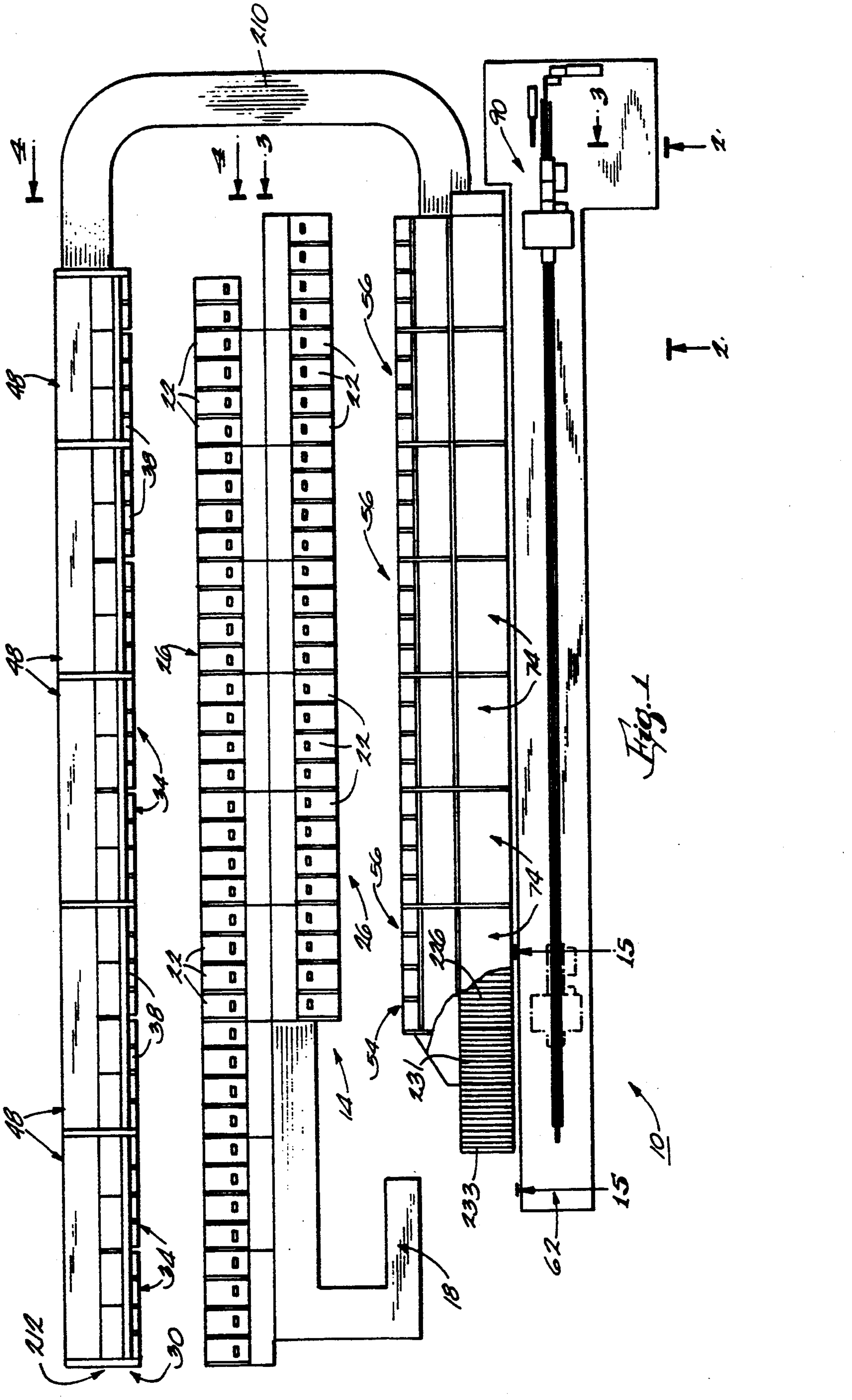
FIG. 1 is a top plan view of a letter sorting apparatus embodying the invention.
Figure 3:
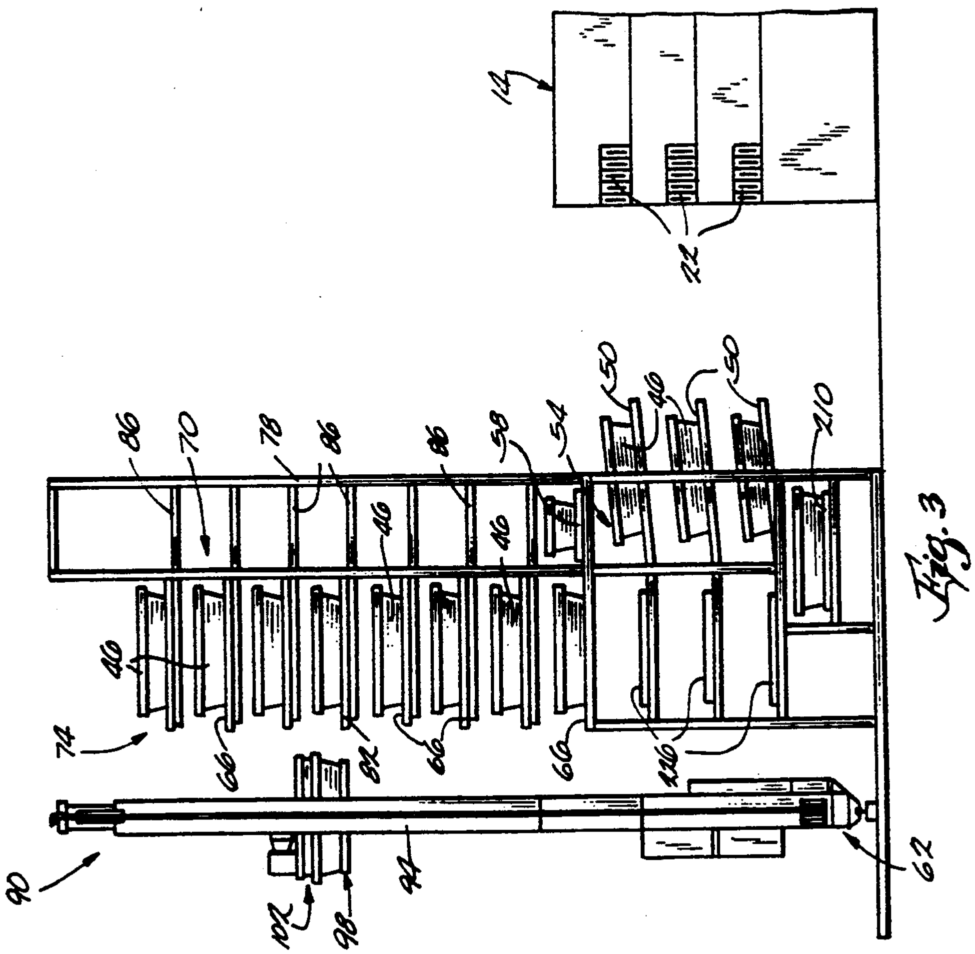
FIG. 3 is a view taken along line 3—3 in FIG. 1.
Figure 2:
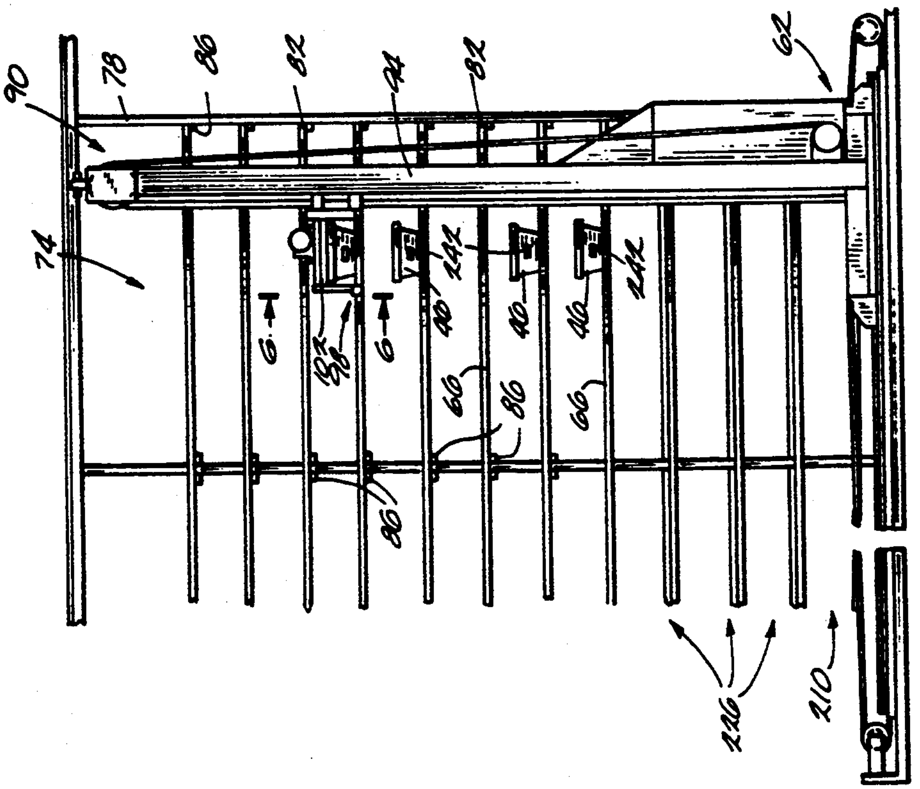
FIG. 2 is a view taken along line 2—2 in FIG. 1.

Before one embodiment of the invention is explained in detail, it is to be understood that the invention is not limited in its application to the details of the construction and the arrangements of components set forth in the following description or illustrated in the drawings. The invention is capable of other embodiments and of being practiced or being carried out in various ways. Also, it is to be understood that the phraseology and terminology used herein is for the purpose of description and should not be regarded as limiting.

DESCRIPTION OF THE PREFERRED EMBODIMENT

A letter sorting apparatus 10 embodying the invention is illustrated in FIGS. 1–5. The apparatus 10 comprises a letter sorting machine 14. While any suitable letter sorting machine can be used, the illustrated letter sorting machine is a delivery bar code sorter (DBCS) that is utilized by the United States Postal Service and that is manufactured by Electrocom Automation, Inc. of Dallas, Tex. Such a DBCS is well known to those skilled in the art and will be described only to the extent necessary for a full understanding of the present invention. Other types of letter sorting machines to which the invention is applicable include, for example, bar code sorters, optical character readers and multiple position letter sorting machines.

The DBCS 14 has opposite ends (left and right ends in FIG. 1) and opposite sides (upper and lower or opposite and near sides in FIG. 1). The DBCS 14 includes, at its left end, means 18 for receiving letters to be sorted. A feed operator puts letters into the receiving means or input of the DBCS 14. The DBCS 14 also includes means for sorting letters, and means on both of the upper and lower sides for dispensing sorted letters. The dispensing means includes three levels of output stackers 22 on both sides of the DBCS 14. A sweep operator on each side removes sorted letters from the output stackers 22. The portion of the DBCS 14 including the output stackers 22 is made of modules 26. Each module 26 is approximately 110 inches long and includes eight output stackers per level.

Letters are sorted to individual area routes by passing the letters twice through the DBCS 14. In other words, letters are initially put into the receiving means 18, and the DBCS 14 reads the bar codes on the letters, partially sorts the letters, and dispenses the letters to the output stackers 22. The letters are then again put in the receiving means for a second pass through the DBCS. Letters in the output stackers 22 must be presented to the receiving means 18 in the proper order for the second pass. After the second pass, the DBCS 14 dispenses to the output stackers 22 letters sorted to the individual carrier routes. Before and after sortation by the DBCS 14, letters are staged and transported in conventional letter receptacles or trays 46.

Figure 4:
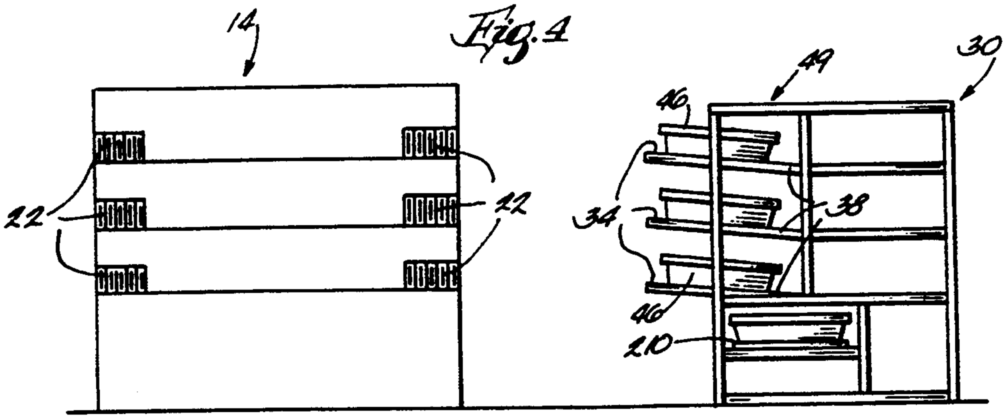
FIG. 4 is a view taken along line 4—4 in FIG. 1.

The apparatus 10 also comprises means adjacent the opposite side of the DBCS 14 for storing or staging trays of letters. While various suitable opposite-side staging means can be employed, in the illustrated embodiment, such means includes (see FIGS. 1 and 4) a modular staging or storage or sweep rack 30 fixed to the floor or other supporting surface. As shown in FIG. 4, the sweep rack defines three levels of staging or storage positions 34, with each level being generally aligned with a respective one of the levels of output stackers 22 on the opposite side of the DBCS 14. Each level is defined by an outwardly and upwardly sloped shelf 38 and includes eight staging positions 34, with each staging position 34 being generally aligned with a respective one of the output stackers 22 of the DBCS 14. Each of the staging positions 34 is adapted to receive a letter tray 46, so that a sweep operator can simply "sweep" letters from an output stacker of the DBCS 14 to the letter tray 46 in the associated staging position. Each tray 46 has thereon a bar code 47 (FIG. 5) identifying the associated output stacker 22. The sweep rack 30 is made of modules 48 (FIG. 1). By design, each module 48 of the sweep rack is approximately 110 inches long, like the modules 26 of the DBCS 14, and includes eight staging positions 34 per level. Located on top of the sweep rack 30 is a non-powered skate wheel conveyor 49 (FIG. 4), the reason for which is explained below.

The apparatus 10 also comprises means adjacent the near side of the DBCS 14 for storing or staging trays of letters from the DBCS sorting means or output stackers 22. The near-side staging means preferably includes means defining a plurality of letter tray storage or staging positions 50. In the illustrated embodiment, the near-side staging means is substantially identical to the sweep rack 30 and includes (see FIGS. 1, 3 and 5) a modular sweep rack 54 also preferably fixed to the floor. The sweep rack 54 defines three levels of letter tray staging positions 50, with each level being generally aligned with a respective level of DBCS output stackers 22. Each level includes a plurality of staging positions 50, with each staging position 50 being generally aligned with a respective output stacker 22. Adjacent staging positions on each shelf are separated by separator strips 42 (FIG. 5) on the upper surface of the shelf. The sweep rack 54 is made of modules 56 (FIG. 1). Each module 56 of the sweep rack 54 is approximately 110 inches long and includes eight letter tray staging positions 50 per level. Located on top of the sweep rack 54 is a non-powered skate wheel conveyor 58 (FIGS. 3 and 5), the reason for which is explained below.

The apparatus 10 also comprises means separate from the DBCS 14 for automatically storing or staging letters from the DBCS dispensing means or output stackers 22, means separate from the DBCS for automatically storing or staging letters or letter trays for input to the DBCS receiving means, means for automatically presenting letters or letter trays in proper order for the second pass through the DBCS 14, means for automatically storing or staging letters from the output stackers 22 after the second pass, and means for automatically presenting letters or letter trays in proper order for conveyance after the second pass. All of the foregoing preferably include (see FIGS. 1–3 and 5) an automatic storage and retrieval system 62 located adjacent the near side of the DBCS 14.

The automatic storage and retrieval system 62 includes means defining a plurality of storage or staging locations 66. While various storage location defining means can be employed, in the illustrated embodiment such means includes (see FIGS. 2 and 3) a modular staging or storage rack 70 mounted on top of the near-side sweep rack 54. The storage rack 70 is made of modules 74. Each module 74 is approximately 110 inches long so that one staging rack module 74 is mounted on top of each sweep rack module 56. Each staging rack module 74 includes (see FIG. 3) a frame 78 mounted on top of the sweep rack 54, seven vertically spaced shelves 82, and cantilever supports 86 which are supported by the frame 78 and which support the shelves 82. Each shelf 82 has a continuous upwardly facing horizontal surface that defines a number of horizontally spaced staging locations 66. Use of the cantilever supports 86 allows the shelves 82 to be supported such that there are no partitions between adjacent letter tray staging locations 66. Also, the top of the sweep rack 54 defines an additional level of letter tray staging locations 66, so that the sweep rack 54 and the storage rack 70 define eight levels of staging locations, and a plurality of bays of staging locations, with each bay including eight vertically aligned letter tray locations.

The automatic storage and retrieval system 62 is provided with (see FIGS. 16–19) a track assembly 88 for reasons more fully explained below. The track assembly 88 is supported on a suitable supporting surface such as the floor, and in the particular embodiment illustrated, includes a track that is preferably an elongated cylindrical rail member **88*a* extending horizontally adjacent the rack system. The underside of the rail member 88*a* is fixed to support members 88*b* which are spaced axially along the rail member 88*a* and which are mounted on a channel-shaped base 88*c*. Suitable means such as fasteners 88*d* are provided to secure the components of the track assembly 88 together. The automatic storage and retrieval system also includes (see FIG. 16) an upper rail 89 which is preferably supported by the storage rack 70**.

The automatic storage and retrieval system 62 also includes (see FIGS. 1–3) a storage and retrieval machine 90. While the storage and retrieval machine 90 can be used in a wide variety of storage and retrieval applications, in the illustrated arrangement the machine 90 receives trays of letters from the DBCS 14 and presents letter trays 46 for input to the DBCS 14. The storage and retrieval machine 90 is also operable to stage letter trays 46 in and retrieve letter trays 46 from the staging locations 66 in the staging rack 70.

Figure 16:
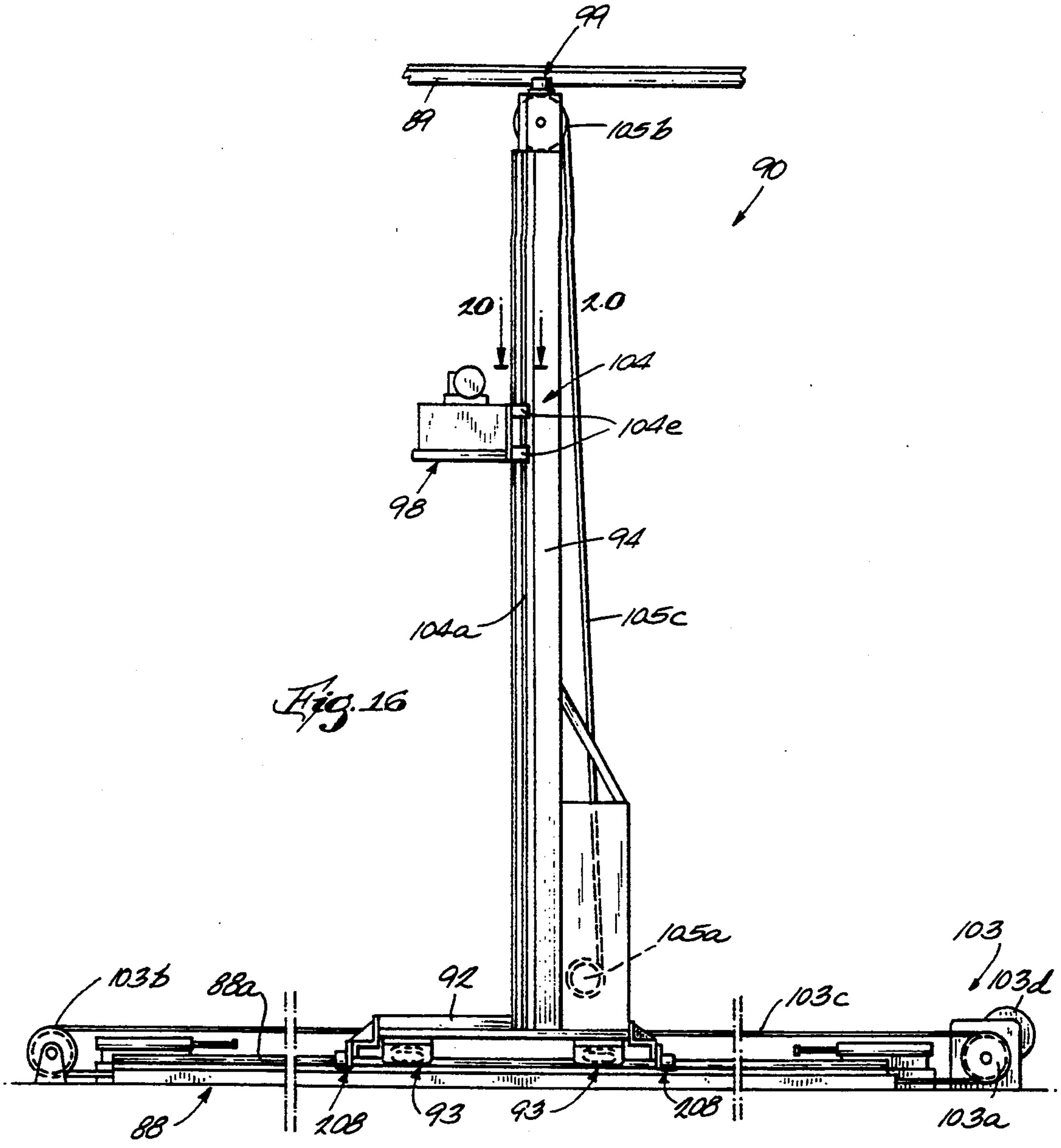
FIG. 16 is an enlarged side elevational view of the storage and retrieval machine shown in FIG. 2.
Figure 17:
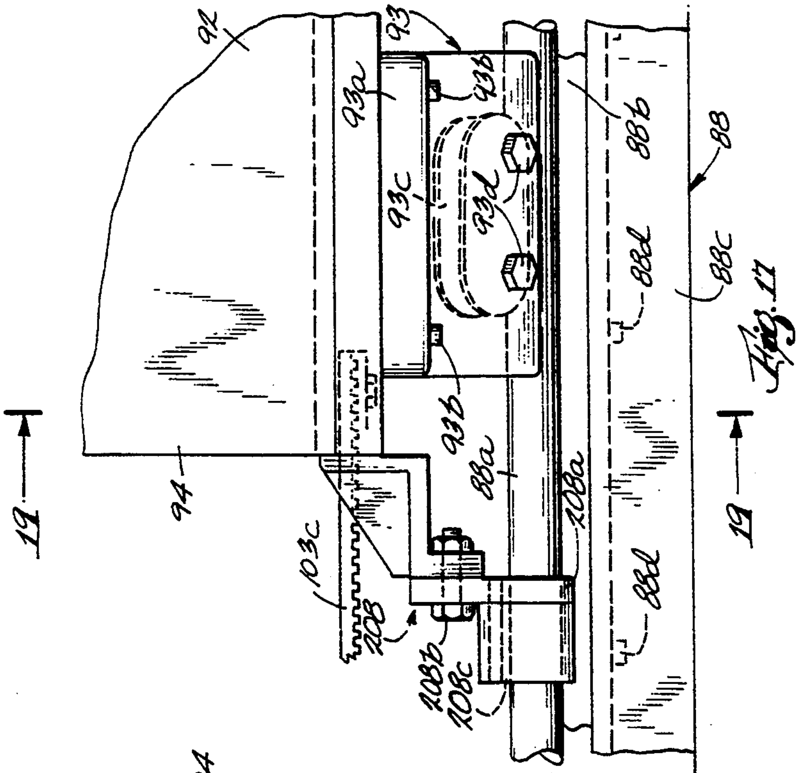
FIG. 17 is an enlarged view of a portion of the storage and retrieval machine shown in FIG. 16.
Figure 19:
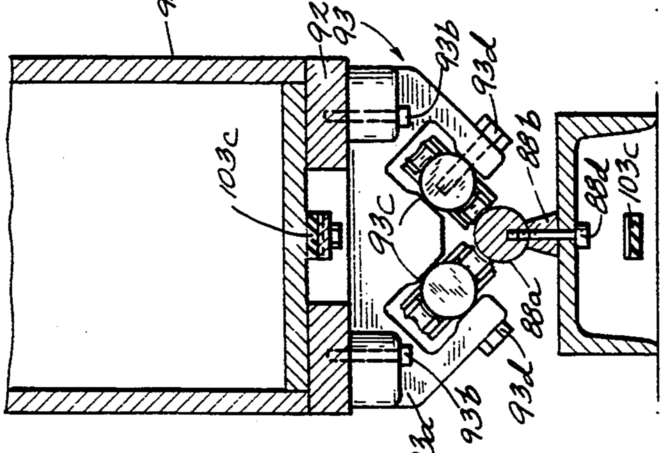
FIG. 19 is a view taken along line 19—19 in FIG. 17.

The storage and retrieval machine 90 includes (see FIG. 16) a chassis or base 92, and means for supporting the base 92 for movement along the track assembly 88 so that the storage and retrieval machine 90 is horizontally moveable relative to the staging rack. While various supporting means can be employed, in the illustrated arrangement the supporting means includes (see FIG. 16) a pair of linear slide assemblies 93 supporting the base 92 on the rail member **88*a*. Referring to FIGS. 17 and 19, each slide assembly 93 includes a V-block 93*a* mounted (via fasteners 93*b*) to the underside of the base 92, and two oppositely axially inclined linear slides 93*c* mounted on the V-block 93*a* with fasteners 93*d*. The linear slides 93*c* provide substantially frictionless sliding engagement between the storage and retrieval machine 90 and the rail member 88*a***. Suitable slide assemblies are produced by Thomson Industries, Inc. of Port Washington, N.Y., and are sold under the name Roundway.

The storage and retrieval machine 90 also includes a mast 94 (see FIG. 16) extending vertically from the base 92, a carriage 98, and shuttle means for sliding a load onto and off the carriage 98 without exerting an upward force on the load. The upper end of the mast 94 is supported for movement along the upper rail 89 by a pair of wheels or rollers 99 (one is shown in FIG. 16) that are mounted on the mast 94. The shuttle means preferably extends above the load and includes (see FIG. 6) a shuttle or extractor mechanism 102 that is horizontally moveable relative to the carriage 98 for placing letter trays 46 in and extracting letter trays 46 from the staging locations 66 in the storage rack 70. While the illustrated apparatus 10 has only one storage rack on one side of the storage and retrieval machine 90, it should be understood that the storage and retrieval machine 90 is capable of accessing a storage rack on the other side of the storage and retrieval machine 90 as well. Thus, the extractor 102 is extendable from both sides of the carriage 98.

Figure 21:
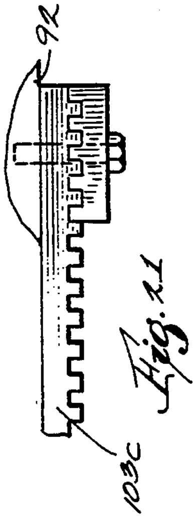
FIG. 21 is a further enlarged view of a portion of the storage and retrieval machine shown in FIG. 16, showing attachment of the base of the machine to a drive belt.
Figure 22:
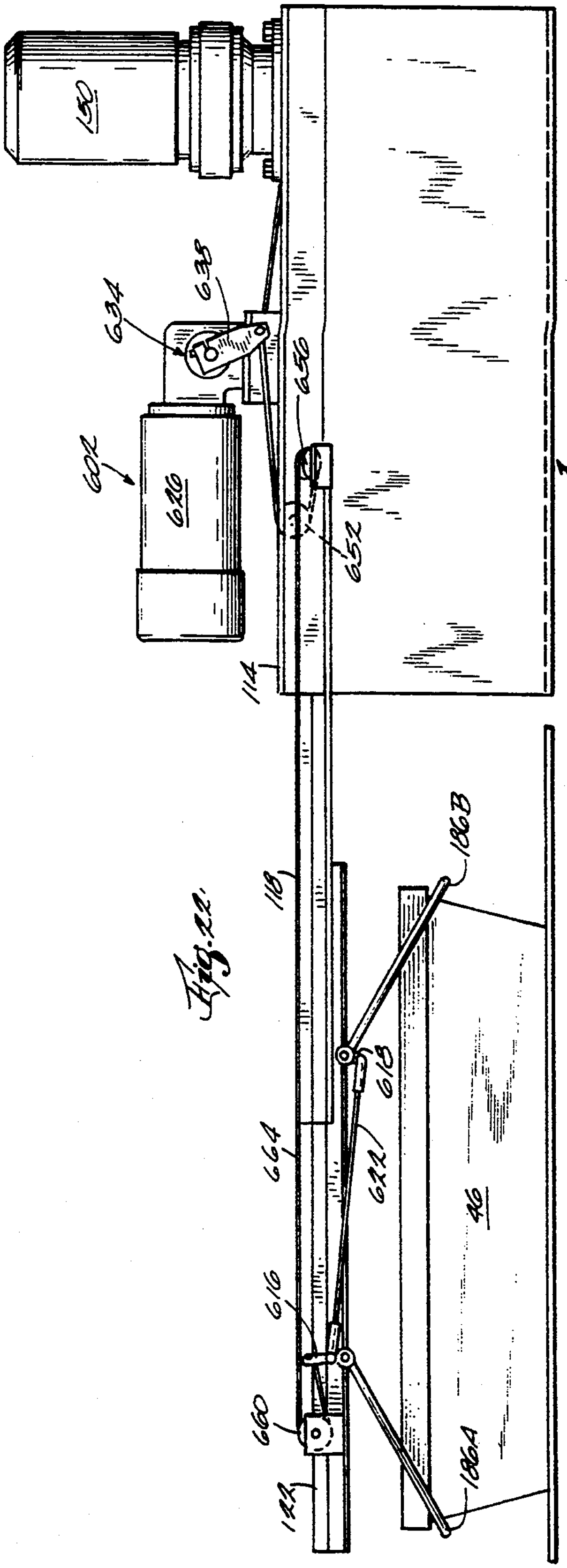
FIG. 22 is a side elevational view of a carriage and extractor assembly including an alternative extractor construction shown with the extractor extended and the hoops lowered.

To move the storage and retrieval machine 90 horizontally, means are provided for moving the base 92 along the rail member 88*a*. While various moving means can be employed, in the illustrated arrangement such means includes a drive mechanism 103. As shown in FIG. 16, the drive mechanism 103 includes drive and idler wheels or sprockets 103*a* and 103*b*, respectively, supported adjacent opposite ends of the rail member 88*a*, and a toothed belt 103*c* trained around the sprockets 103*a* and 103*b* and connected (FIG. 21) at its opposite ends to the opposite ends of the base 92. The belt 103*c* is preferably a POLY CHAIN GT belt manufactured by Gates. A stationary motor 103*d* is drivingly connected to the drive sprocket 103*a* via a gear reducer to pull the storage and retrieval machine back and forth along the rail member 88*a*.

Figure 20:
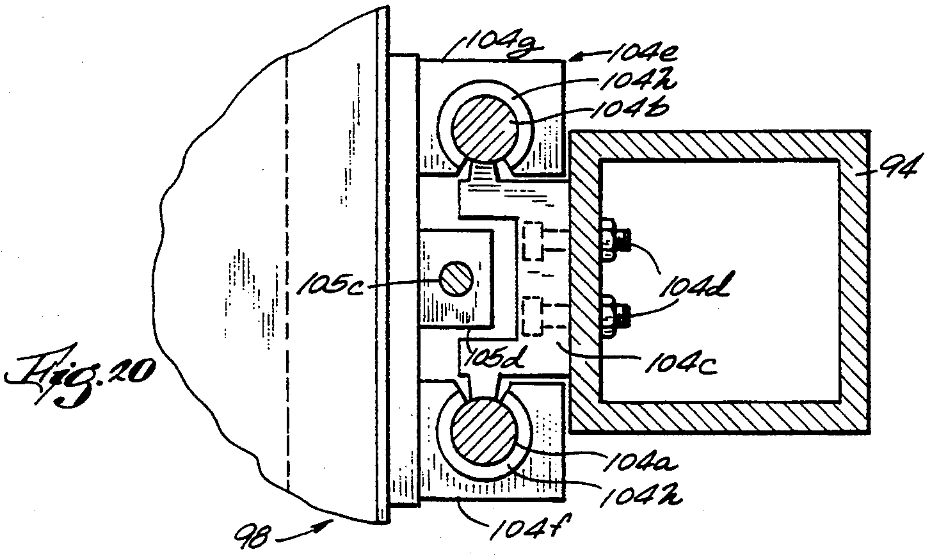
FIG. 20 is a view taken along line 20—20 in FIG. 16.

Means are also provided for supporting the carriage 98 on the mast 94 for vertical movement relative thereto. In the illustrated arrangement (see FIG. 16) the means for supporting the carriage 98 on the mast 94 includes a mounting assembly 104 including a pair of spaced apart vertically extending cylindrical rods 104*a* and 104*b*. The rods 104*a* and 104*b* are fixed to a support bracket 104*c* that is mounted on the mast 94 by fasteners 104*d* or by other suitable means. The mounting assembly 104 also includes (FIG. 16) upper and lower bearing assemblies 104*e* for supporting the carriage 98 for vertical sliding movement along the rods 104*a*. The upper and lower bearing assemblies 104*e* are preferably identical and the upper bearing assembly is illustrated in more detail in FIG. 20. Each bearing assembly 104*e* includes a pair of spaced apart pillow blocks 104*f* and 104*g* fixed to the carriage 98, and a linear bearing 104*h* mounted in each pillow block. The bearing 104*h* in block 104*f* slideably receives the rod 104*a*, and the bearing 104*h* in block 104*g* slideably receives the rod 104*b*. Each linear bearing 104*h* extends in excess of 180° around the associated rod 104*a* or 104*b*.

Means are also provided for selectively moving the carriage 98 up and down the mast 94. In the illustrated arrangement (FIG. 16) the moving means includes a motor (not shown) supported on the base 92 for driving a drum 105*a*. The moving means also includes a pulley 105*b* rotatably supported on top of the mast 94, and a cable 105*c* reeved around the drum 105*a* and over the pulley 105*b* and connected to the carriage 98 via (FIG. 20) a mounting block 105*d*.

The carriage 98 and a first construction of the extractor 102 are more particularly illustrated in FIGS. 6 through 11. The carriage 98 includes (see FIGS. 6 and 7) a frame 106 providing an upwardly facing surface 110 for supporting a letter tray 46. The extractor 102 includes an upper plate or top member 114 preferably fixed to the carriage frame 106 in upwardly spaced, parallel relation to the tray supporting surface 110. The extractor 102 also includes an intermediate plate or member 118 which is located below the top member 114 and which is supported by the top member 114 for horizontal sliding movement relative thereto. The extractor 102 also includes a lower plate or bottom member 122 which is located below the intermediate member 118 and which is supported by the intermediate member 118 for horizontal sliding movement relative thereto and thus relative to the top member 114.

More particularly, as best shown in FIG. 7, the intermediate member 118 includes, adjacent each corner thereof, an upwardly offset, horizontally extending mounting flange 126. Extending downwardly from each of the flanges 126 is an H-shaped bearing block or slide 130 defining both an outwardly opening bearing track 134 and an inwardly opening bearing track 138. A pair of bearing supporting members 142 extend downwardly from the top member 114. One of the bearing supporting members 142 has mounted thereon an upper slide or bearing strip 146 slidably received in the bearing track 134 of one of the bearing blocks 130, and the other bearing supporting member 142 has mounted thereon a bearing strip 146 slidably received in the bearing track 134 of the other bearing block 130. The bearing strips 146 support the intermediate member 118 for horizontal sliding movement relative to the top member 114. Similarly, a pair of bearing supporting members 147 extend upwardly from the bottom member 122. One of the bearing supporting members 147 has mounted thereon a lower slide or bearing strip 148 slidably received in the bearing track 138 of one of the bearing blocks 130, and the other bearing supporting member 147 has mounted thereon a bearing strip 148 slidably received in the bearing track 138 of the other bearing block 130. The bearing strips 148 support the bottom member 122 for horizontal sliding movement relative to the intermediate member 118. The bearing strips 146 and 148 can be made of any suitable low-friction material.

Figure 8:
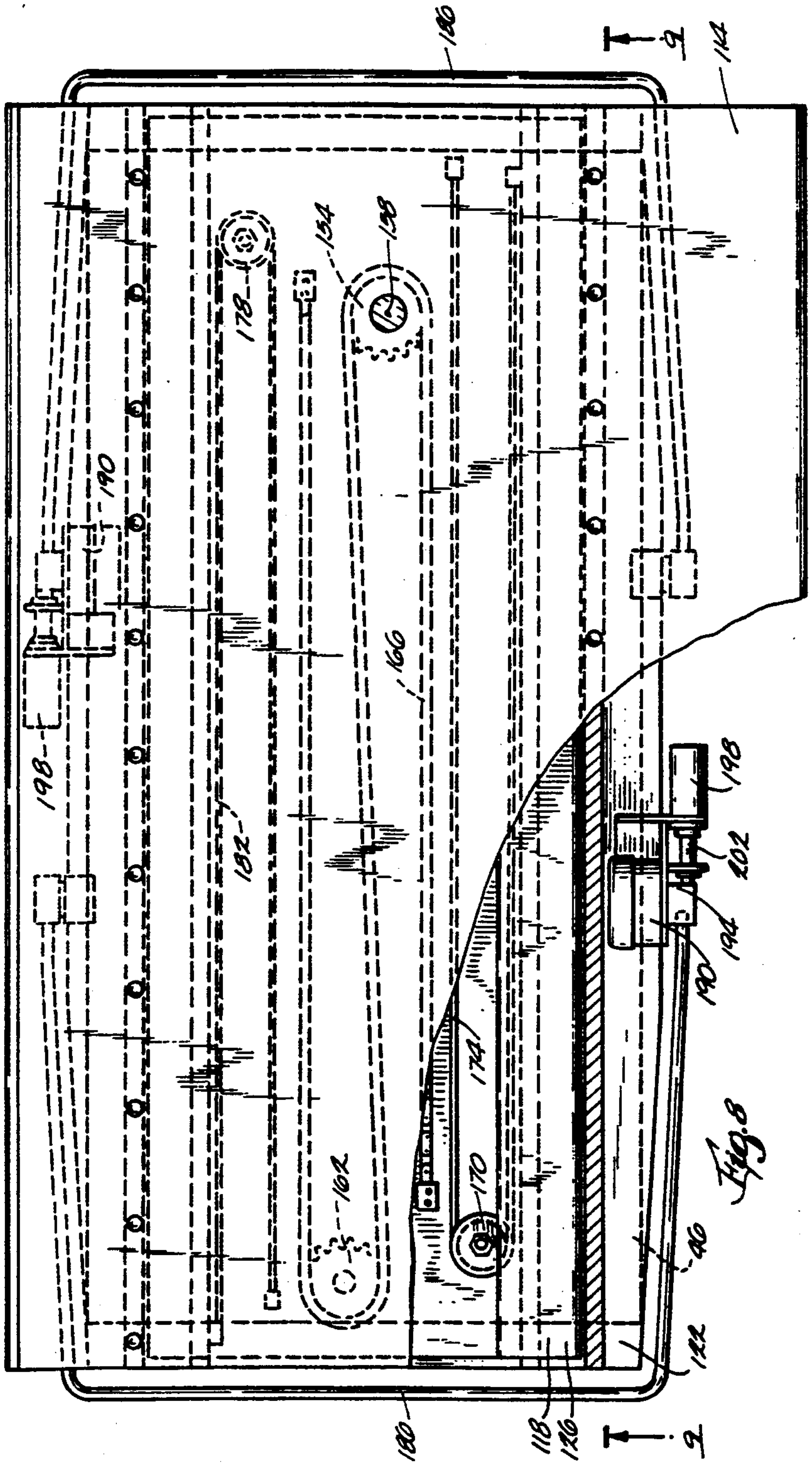
FIG. 8 is a top plan view, partially broken away, of the carriage and extractor assembly shown in FIG. 6.
Figure 9:
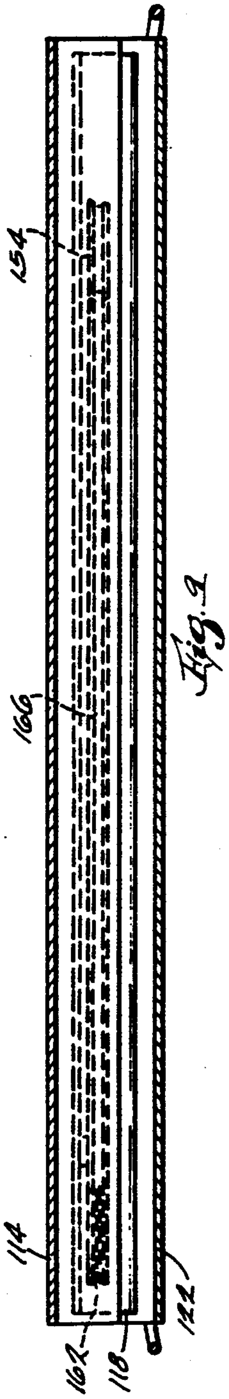
FIG. 9 is a view taken along line 9—9 in FIG. 8.

Means are provided for extending and retracting the extractor 102, i.e., for causing sliding movement of the intermediate and bottom members 118 and 122 relative to the top member 114. While various extending and retracting means can be employed, in the illustrated arrangement this means includes (see FIGS. 6 and 7) a drive motor 150 mounted on the top member 114. The motor 150 is reversible and drives a sprocket 154 (FIGS. 9 and 10) which is located below the top member 114 and which rotates about a vertical axis 158. The means for extending and retracting the extractor 102 also includes an idler sprocket 162 rotatably supported by the top member 114, and a drive chain 166 which is driven by the drive sprocket 154, which passes around the idler sprocket 162, which has a first end fixed to the intermediate member 118 adjacent the right end thereof (as shown in FIG. 8), and which has a second end fixed to the intermediate member 118 adjacent the left end thereof (as shown in FIG. 8). Thus, as is apparent from viewing FIGS. 8 and 10, clockwise rotation of the drive sprocket 154 pulls the intermediate member 118 to the left relative to the top member 114, and counterclockwise rotation of the drive sprocket 154 pulls the intermediate member 118 to the right relative to the top member 114.

The means for extending and retracting the extractor 102 also includes (see FIGS. 8 and 10) an idler pulley 170 pivotally mounted on the intermediate member 118, a cable 174 which is reeved around the pulley 170 and which has one end fixed to the top member 114 and an opposite end fixed to the bottom member 122, an idler pulley 178 rotatably mounted on the intermediate member 118, and a cable 182 which is reeved around the pulley 178 and which has one end fixed to the top member 114 and an opposite end fixed to the bottom member 122. As is apparent from viewing FIG. 8, movement of the intermediate member 118 to the left causes movement of the pulley 170 relative to the top member 114, and such movement of the pulley 170 causes the cable 174 to pull the bottom member 122 to the left relative to the intermediate member 118. Movement of the intermediate member 118 to the right relative to the top member 114 causes movement of the pulley 178 to the right relative to the top member 114, and such movement of the pulley 178 causes the cable 182 to pull the bottom member 122 to the right relative to the intermediate member 118. The cable and pulley arrangements cause the bottom member 122 to move twice as fast as the intermediate member 118.

Thus, clockwise rotation of the drive sprocket 154 causes movement of the intermediate member 118 and bottom member 122 to the left (as shown in FIG. 8), and counterclockwise rotation of the drive sprocket causes movement of the intermediate member 118 and bottom member 122 to the right.

Figure 10:
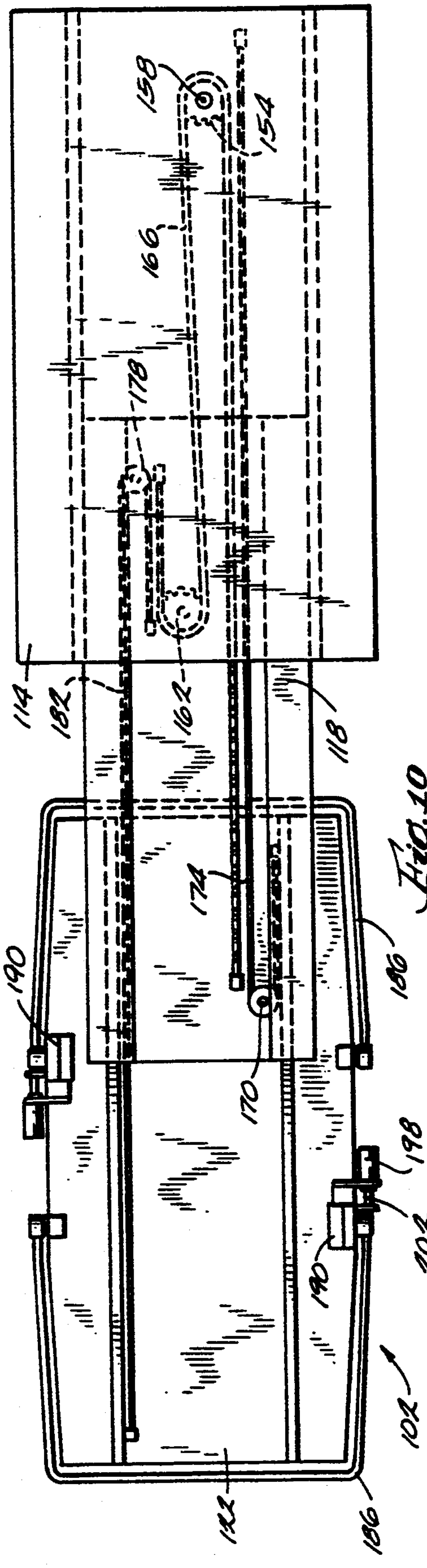
FIG. 10 is a reduced top plan view of the carriage and extractor assembly shown in FIG. 6 with the extractor extended.
Figure 11:
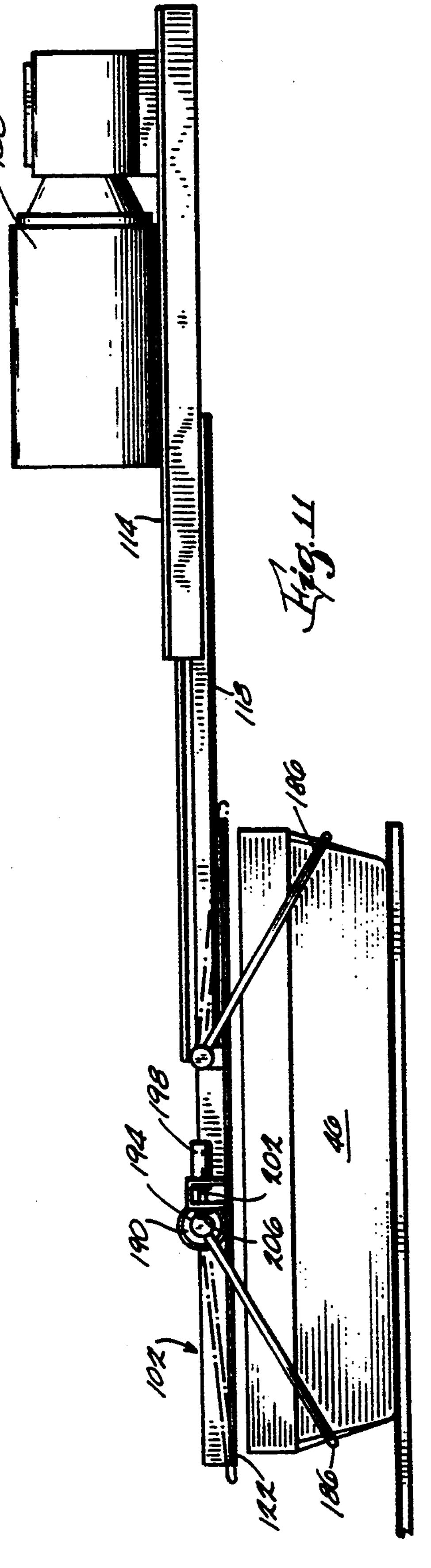
FIG. 11 is a side elevational view of the carriage and extractor assembly shown in FIG. 10 and with the extractor in an extended position.

Accordingly, the extractor 102 is operable between a retracted condition (FIG. 6) and an extended condition (FIGS. 10 and 11). In the retracted condition, the intermediate and bottom members 118 and 122 are aligned directly beneath the top member 114 and contained within the carriage so that the members are out of the way and protected during movement of the carriage. In the extended condition, the intermediate member 118 extends outwardly in one direction relative to the top member 114, and the bottom member 112 extends outwardly in the same direction relative to the intermediate member 118.

Figure 6:
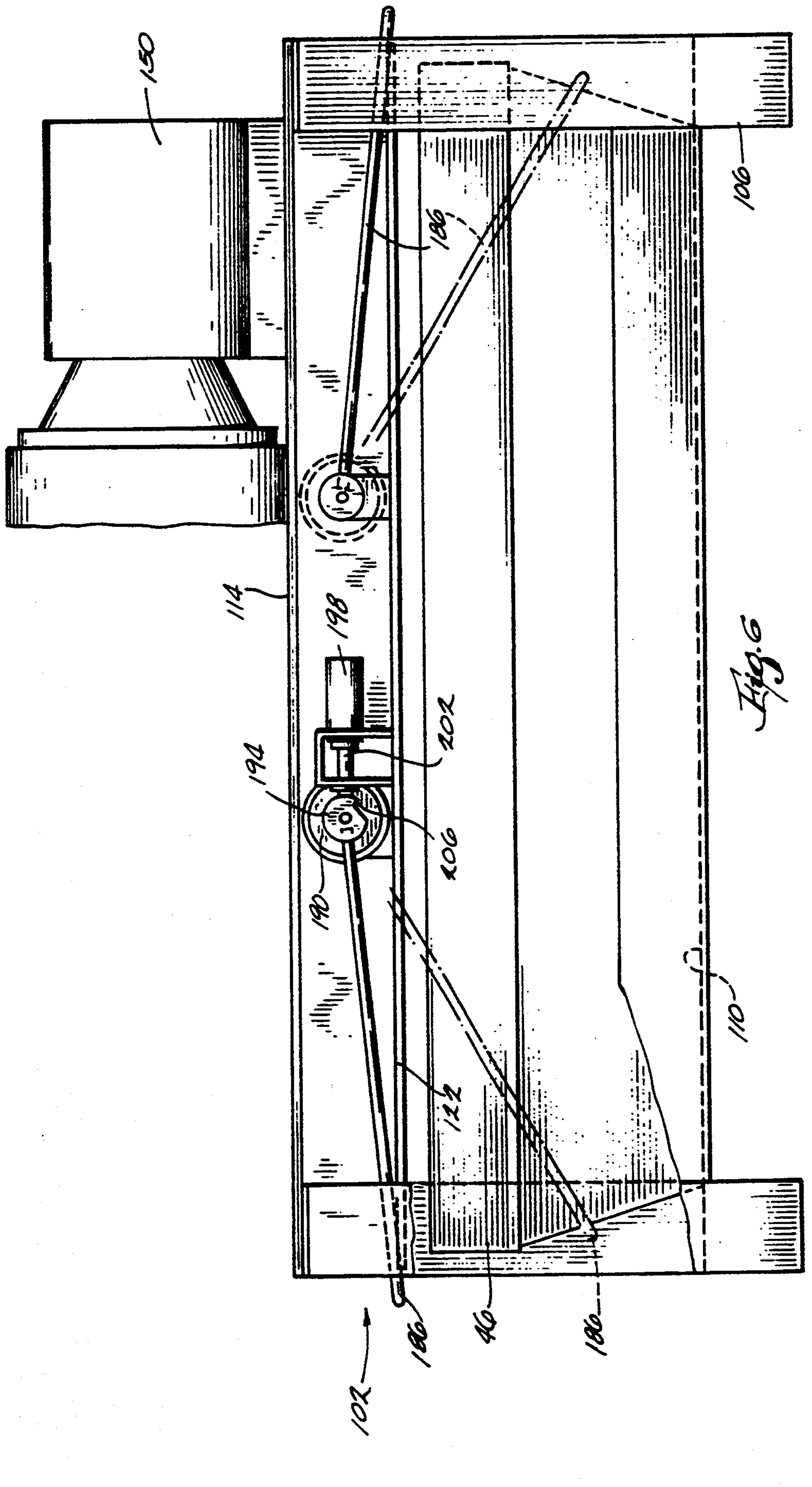
FIG. 6 is an enlarged view which is taken along line 6—6 in FIG. 2 and which shows the carriage and extractor assembly with the extractor in a retracted position.
Figure 4:
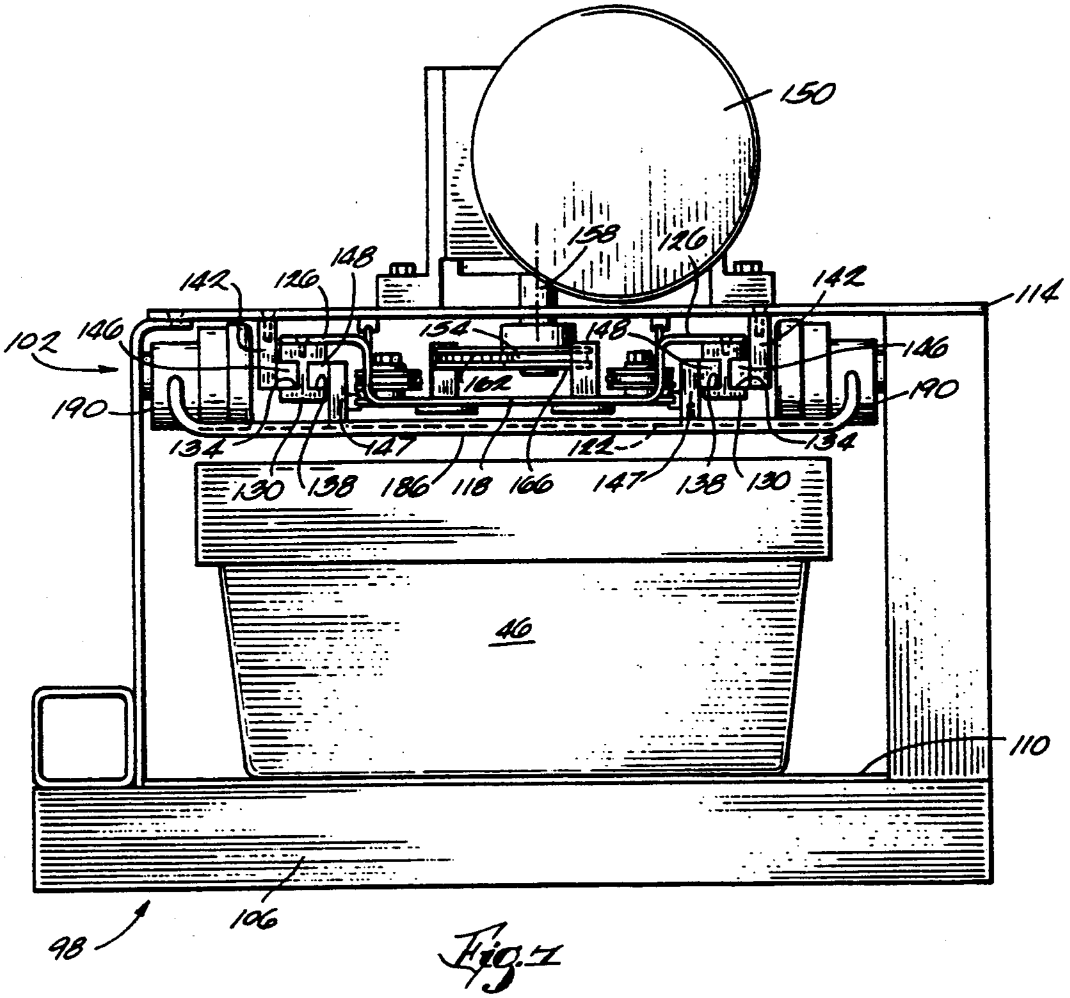

Means are provided on the bottom member 122 for selectively engaging an object (i.e., a letter tray 46) beneath the bottom member 122 so that the object moves horizontally in common with the bottom member 122. While the engaging means can be configured to move various objects to permit the storage and retrieval device 90 to be used in other applications, in the illustrated arrangement the engaging means includes (see FIGS. 6, 8, 10 and 11) a pair of generally U-shaped members or hoops 186 each having opposite ends pivotally mounted on the bottom member 122. Referring to FIG. 6, each of the hoops 186 is pivotally moveable between an upper position (shown in solid lines) wherein it extends substantially parallel to the bottom member 122, and a lower position (shown in phantom) wherein it extends transversely and downwardly relative to the bottom member 122. When the hoops 186 are in their upper positions, the bottom member 122 can pass over a letter tray 46 located in the storage rack 70 without interference between the hoops 186 and the letter tray 46. When the hoops 186 are moved to their lower positions, each of the hoops 186 is engageable with a respective end of the letter tray 46 so as to substantially prevent horizontal movement of the letter tray 46 relative to the bottom member 122.

Means are provided for selectively pivoting the hoops 186 relative to the bottom member 122. Such means preferably includes means for simultaneously moving the hoops 186 to their upper positions and for simultaneously moving the hoops 186 to their lower positions. While various hoop pivoting means can be employed, in the embodiment illustrated in FIGS. 6, 8, 10 and 11 such means includes, for each of the hoops 186, a torsional motor or solenoid 190 (FIGS. 6 and 8) which is mounted on the bottom member 122 for movement therewith and which is drivingly connected to one end of the hoop. The solenoid 190 is biased so as to bias the hoop to its upper position, and actuation of the solenoid 190 causes movement of the hoop to its lower position. Means are provided for selectively retaining the hoop in its lower position. This means preferably includes (see FIGS. 6 and 11) a cam 194 fixed to the hoop for pivotal movement therewith about the solenoid axis, and a linear motor or solenoid 198 having an outwardly biased plunger 202 engaging the cam 194. When the hoop moves to its lower position, pivotal movement of the cam allows the plunger 202 to "fall off" a step 206 on the cam, and the plunger thereafter interferes with the step so as to prevent pivotal movement of the cam and the hoop in the opposite direction. Engagement of the step 206 by the plunger 202 therefore prevents movement of the hoop from its lower position. Accordingly, neither of the solenoids needs to be actuated in order to retain the hoop in its lower position. In order to return the hoop to its upper position, the linear solenoid is actuated. This retracts the plunger so that the plunger 202 no longer interferes with the step 206, and this allows the natural bias of the torsional solenoid 190 to return the hoop to its upper position.

This arrangement minimizes the amount of electricity needed to operate the hoops 186. The torsional solenoids 190 naturally bias the hoops 186 to their upper positions. Only a momentary current is necessary to move the hoops 186 to their lower positions. Thereafter, the spring bias of the linear solenoids 198 retains the hoops 186 in their lower positions. Only a momentary actuation of the linear solenoids 198 is necessary to return the hoops 186 to their upper positions. Once the steps 206 clear the plungers 202 of the linear solenoids 198, the linear solenoids 198 can be deactivated.

The carriage and extractor assembly operates as follows. When the supporting surface 110 of the carriage is aligned with a shelf 82 in the staging rack 70, the drive sprocket 154 is rotated clockwise so as to extend the bottom member 122 above a letter tray 46 on the shelf. The hoops 186 (or only the outer hoop if the third embodiment is employed) are then moved to their lower positions to capture the letter tray 46, and the drive sprocket is rotated counterclockwise so as to retract the bottom member 122. Engagement of the letter tray 46 by the hoops 186 causes the letter tray 46 to move with the bottom member 122 and slide off the shelf onto the carriage supporting surface 110. Location of the bottom member 122 immediately above the letter tray 46 substantially prevents letters from coming out of the tray 46 during movement of the tray 46. The hoops 186 remain in their lower positions during movement of the carriage relative to the staging rack 70.

Figure 18:
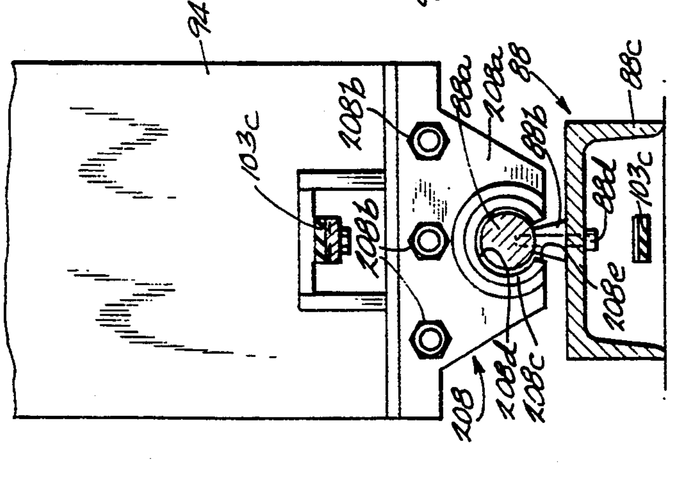
FIG. 18 is a left end view of the storage and retrieval machine portion shown in FIG. 17.

To prevent the storage and retrieval machine 90 from being derailed, means are provided on the base 92 for preventing its upward movement relative to the rail member **88*a*. While various movement prevention means can be employed, in the illustrated arrangement such means includes (see FIG. 16) a pair of retainer assemblies 208 positioned outside of the slide assemblies 93 adjacent the opposite ends of the base 92. As shown in FIGS. 17 and 18, each retainer assembly 208 includes a mounting or pillow block 208*a* fixed to the base 92 by suitable means such as fasteners 208*b*, and an arcuate bushing bearing or retainer 208*c*. The retainer 208*c* includes an inner bearing surface 208*d* that extends beneath the rail member 88*a* and in excess of 180° around the rail member 88*a* to provide an opening 208*e* adjacent the underside of the rail member 88*a*. The bearing surface 208*d* defines a bore which communicates with the opening 208*e*** and through which the rail member 88*a* extends. The opening 208*e* accommodates the support members 88*b*. During normal operation of the storage and retrieval machine 90, the bearing surface 208*d* preferably remains slightly spaced from the rail member 88*a*, slideably contacting the rail member 88*a* only when the base 92 becomes slightly misaligned with respect to the rail member 88*a*.

Figure 5:
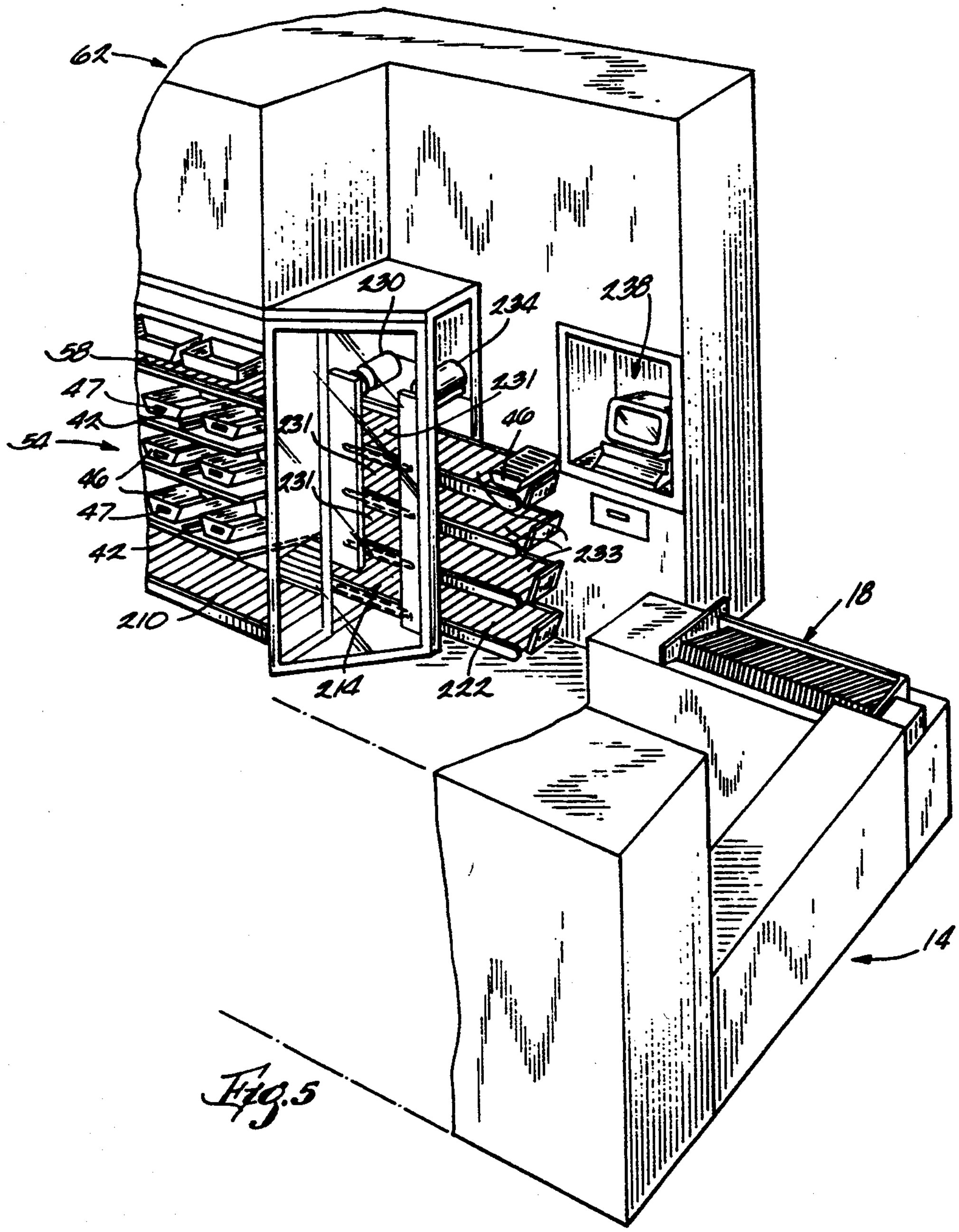
FIG. 5 is a partial perspective of the apparatus.

The apparatus 10 further comprises means for transporting or conveying letter trays from the opposite-side sweep rack 30 to the storage and retrieval machine 90. The transporting means includes (see FIGS. 1) a horseshoe-shaped lower or input tray transport system or conveyor 210. The input tray transport system 210 includes (see FIG. 4) an upstream portion running through the opposite-side sweep rack 30 below the sweep rack staging positions 34. This portion of the tray transport system 210 runs from left to right as shown in FIG. 1. The tray transport system 210 also includes (see FIG. 3) a downstream portion running through the near-side sweep rack 54 beneath the staging positions 50 thereof. This portion of the tray transport system 210 runs from right to left as shown in FIG. 1. The tray transport system 210 also includes a middle portion which runs from top to bottom in FIG. 1 and which connects the upstream and downstream portions of the tray transport system 210. As shown in FIG. 5, the tray transport system 210 jogs inwardly (downwardly in FIG. 1) at its downstream end. The upstream end of the tray transport system 210 is referred to hereinafter as the tray induction station 212 (FIG. 1), because trays can be placed on the tray transport system at this point. Several motors (not shown) drive the tray transport system 210.

Figure 15:
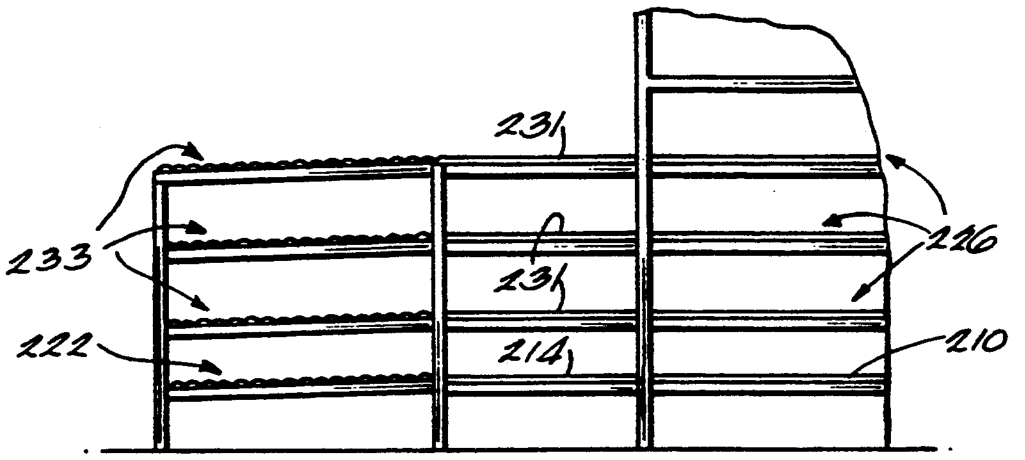
FIG. 15 is a view taken along line 15—15 in FIG. 1.

As shown in FIGS. 5 and 15, pick-up and delivery powered conveyor rollers (P&D station) 214 are located adjacent the downstream end of the tray transport system 210 and run from right to left in FIG. 1. Trays on the input tray transport system 210 are deposited onto the P&D station 214, which is accessible by the storage and retrieval machine 90. A set of gravity rollers 222 is located adjacent the downstream end of the P&D station 214. The rollers 222 define an operator station. The gravity rollers 222 operate by gravity and present trays to the feed operator. If a tray 46 at the P&D station 214 is not to be retrieved by the storage and retrieval machine 90, the P&D powered rollers 214 convey the tray 46 to the operator station gravity rollers 222 so that the tray 46 is delivered to the operator. This will happen when the control system cannot read a tray bar code.

When a tray 46 in the opposite-side sweep rack 30 becomes full, or when a DBCS pass is ended, an operator removes the tray 46 from its staging position in the opposite-side sweep rack 30 and places the tray 46 on the tray transport system 210. The tray 46 is then conveyed to the pick-up and delivery station 214 where the tray 46 can be retrieved by the storage and retrieval machine 90 or allowed to pass to the operator (in the event of a bar code "no-read").

The apparatus 10 also comprises means for conveying or transporting letter trays from the near-side sweep rack 54 to the storage and retrieval machine 90. This transporting means preferably includes (see FIGS. 3 and 15) the input tray transport system 210 and three additional output belts or conveyors 226 running through the near-side sweep rack 54. Each of the output belts 226 runs from right to left as shown in FIG. 1. Each belt 226 is located immediately behind an associated level of staging positions 50 such that a sweep operator can push letter trays from any one of the staging positions 50 onto the associated output belt 226. Means are provided for driving the belts 226. Such means includes (see FIG. 5) a drive motor 230 selectively clutched to drive each of the belts 226.

As shown in FIGS. 1, 5 and 15, P&D powered conveyor rollers (P&D rollers or P&D station) 231 are located adjacent the downstream end of each of the output belts 226 and run from right to left in FIG. 1. Each set of P&D conveyor rollers 231 is identical to the P&D conveyor rollers 214. A tray 46 on one of the output belts 226 is deposited onto the associated set of P&D powered conveyor rollers 231, which is accessible by the storage and retrieval machine 90. A set of gravity rollers 233 is located adjacent the downstream end of each P&D station 231. Each set of gravity rollers 233 is identical to the gravity rollers 222. Each set of rollers 233 defines an operator station, where the trays are accessible by the feed operator.

Means are provided for driving the powered conveyor rollers 214 and 231. Such means preferably includes (see FIG. 5) a drive motor 234 selectively clutched to drive each of the sets of rollers 214 and 231.

Adjacent the P&D station 214 at the downstream end of the input tray transport system 210 is a bar code scanner pair (not shown) that is connected to the control system 238. The control system 38 reads the bar code on any tray 46 before that tray 46 reaches the input P&D station 214.

The apparatus 10 operates as follows:

It should be recalled that letters are sorted to individual area routes by passing the letters twice through the DBCS 14. Letters are put into the receiving means 18 for first pass, and the DBCS 14 partially sorts the letters and dispenses the letters to the output stackers 22. The letters are then put into the receiving means for second pass, and the DBCS 14 dispenses to the output stackers 22 letters sorted to the individual carrier routes.

Before mail sortation by the DBCS 14 may begin, the sweep racks 30 and 54 must be staged or supplied with empty mail trays. The empty trays are distributed on the sweep racks 30 and 54 by placing stacks of empty trays on the non-powered skate wheel conveyor 58 at the uppermost level of the sweep racks and pushing the trays along in slugs. An empty tray 46 is placed in each of the three sloped staging positions in the sweep racks 30 and 54. In addition, eight to nine empty trays are positioned on the top level of the sweep racks at each horizontal position.

Alternatively, stacks of nested empty trays are placed on the input tray transport system 210 at the tray induction station 212. Three to six empty trays are placed in each stack. The stacks of empty trays are allowed to travel along the input tray transport system 210 to the downstream end of the tray transport system 210. Once all staging positions are staged with an empty tray 46 and there are sufficient extra empty trays staged on the top level of the sweep racks, the input tray transport system 210 is cleared of all empty trays.

Next, a bar code tag 47 is placed on each of the trays staged in the staging positions in the sweep racks. The bar code label 47 identifies the DBCS output stacker 22 that the mail is transferred from as it is placed in the empty tray 46. The preprinted labels 47 are inserted into existing plastic sleeves provided on the mail trays 46.

All carts of trayed mail to be processed at the DBCS 14 are delivered to the tray induction station 212 at the upstream end of the input tray transport system 210. The trays are unloaded onto the input tray transport system 210 and allowed to travel to the P&D station 214 (see FIG. 5) at the downstream end of the input tray transport system 210. At this point in the operation the staging rack 70 is empty.

As the trays are processed at the P&D station 214, the bar code on each tray 46 is scanned by the bar code scanner pair. Each tray of mail to be processed at the DBCS 14 arrives with a bar code label that was attached at the previous station. A positive read of the bar code label informs the apparatus 10 that the tray 46 requires first pass processing.

The trays arriving at the P&D station 214 are stored by the storage and retrieval machine 90 in the staging rack 70. Any empty location in the staging rack 70 may be used. To minimize the access time of the storage and retrieval machine 90, the trays are first placed in the staging rack 70 in the positions closest to the output P&D stations 231. The three levels of output belts 226 in the staging rack 70 serve as input positions from the sweep rack 54 at the end of both sortation passes and are not accessible by the storage and retrieval machine 90.

Sufficient staging rack capacity has been provided to stage all of the trays requiring first pass processing. There are eight levels in each bay of the staging rack 70. When approximately 80% of the available capacity in the staging rack 70 is utilized, the storage and retrieval machine 90 no longer stores the incoming trays. The trays of mail to be sorted on first pass are then allowed to queue along the entire length of the input tray transport system 210.

When first pass processing of the mail is started, the storage and retrieval machine 90 begins to deliver trays to the DBCS operator via the operator stations. The storage and retrieval machine 90 retrieves the trays arriving at the P&D station 214 at the end of the tray transport system 210 and places the trays on one of the three output P&D stations 231 (i.e., on one of the sets of powered conveyor rollers 231). From here the trays 46 are moved onto the gravity rollers 233 and thus to the feed operator. If a deposit position is not available at one of the output P&D stations 231, the trays are placed in the staging rack 70. The trays of mail on the input tray transport system 210 are the first trays delivered to the DBCS feed operator by the apparatus 10.

After the trays on the input tray transport system 210 have been processed, the storage and retrieval machine 90 begins to retrieve the trays of mail waiting for first pass processing in the staging rack 70 and delivers them to the output P&D stations 231. From here the trays 46 are moved onto the gravity rollers 233 and thus to the feed operator. All of the mail to be processed on first pass has the same priority and is retrieved accordingly.

The sweep operator transfers the sorted first pass mail from the DBCS output stackers 22 to the empty trays in the sweep racks 30 and 54. When a tray 46 is completely filled before first pass is over, meaning there are multiple trays of sorted mail from the same DBCS output stacker 22, the full tray 46 is placed on the input tray transport system 210 and travels to the input conveyor P&D station 214. Such a full tray 46 is referred to as an "overflow" tray. If the input tray transport system 210 is not clear at the position where the overflow tray 46 occurs (the input tray transport system 210 may contain trays waiting for first pass sortation), the tray is placed on the top level of the sweep rack. The trays of mail placed on the top of the sweep racks are placed on the input tray transport system 210 when a clear window appears. The reason the trays on the input tray transport system 210 are processed before the trays in the staging rack 70 is to help maintain open windows on the input tray transport system 210.

As the trays are being processed and as first pass continues, more trays may be introduced at the tray induction station 212 on the input tray transport system 210. As these trays arrive at the P&D station 214 the bar code scanner pair scans the label end of the tray. If a label is read without the first pass bar code 47, the tray is scheduled for immediate first pass processing. When a valid read of a first pass label 47 with the corresponding DBCS output stacker number occurs, the tray is an overflow and is staged in the staging rack 70. This tray remains in the staging rack 70 waiting to be sequenced for second pass processing. The information associated with this tray is entered in the control system database.

First pass sortation ends as all unsorted trays have been processed. The computer control system maintains a count of the trays in the staging rack 70 that are to be sorted on first pass and dynamically updates and displays this information on the control monitor. To reduce the time from the end of first pass to the start of second pass, all overflows are placed on the input tray transport system 210 and staged in the staging rack 70 before the end of first pass processing. At this point in the operation the input tray transport system 210 should be clear.

The first step in preparing to process the mail for second pass is to verify that all of the trays that are overflows for any DBCS output stacker 22 have been placed on the input tray transport system 210.

The sweep operator completely sweeps all first pass mail from each DBCS output stacker 22 and places it in the corresponding tray at the sloped positions in the sweep racks 30 and 54.

Next, the sweep operator places all the trays from the three levels of opposite-side sweep rack 30 onto the input tray transport system 210. It is preferable that these trays be placed on the input tray transport system 210 in exact DBCS output stacker sequence. Not all of the trays from the opposite-side sweep rack 30 are able to queue on the input tray transport system 210. Only the minimum number of trays need to be staged in the staging rack 70 before second pass processing may begin. This leaves the input tray transport system 210 completely loaded as second pass processing begins.

Each of the trays at the near-side sweep rack 54 (even empty trays) is pushed onto one of the three belts 226. Care must be taken to correctly position these trays to ensure the proper orientation on the belts 226. (Overflow trays are not pushed onto the belts 226 in the sweep rack 54 during processing. They are placed on the input tray transport system 210 to be staged in the storage and retrieval machine 90.)

At this point all first pass overflows are in the staging rack 70, the three belts 226 hold the three levels of first pass trays inserted from the near-side sweep rack 54, and the input tray transport system 210 is completely full of first pass trays arriving from the opposite-side sweep rack 30.

When second pass processing is started, the three output belts 226 begin to deliver the trays to the three output P&D stations 231. The trays are advanced into the P&D stations 231 in the exact sequence to correspond to the first DBCS output stacker locations. Only one tray at a time is indexed from the output belt 226 through the P&D station 231 to the associated rollers 233 and thus to the feed operator. Tray sequencing is maintained by presenting only one tray at a time to the feed operator.

All staging positions 34 and 50 are now re-supplied with empty trays from the top level of the sweep racks 30 and 54. The bar code labels 47 printed by the DBCS 14 are inserted in the plastic sleeves attached to the trays 46. The bar code labels 47 contain carrier route and dispatch information.

The control system keeps track of the overflow trays 46 and delivers them as required to match the trays from each DBCS output stacker 22. The overflows are queued in the output P&D stations 231 by the storage and retrieval machine 90 and are released to the operator stations (the rollers 233) under the direction of the control system. Because the overflow trays are completely full, they are the first trays delivered to the DBCS feed operator.

After all the first pass trays on the three levels of belts 226 in the sweep rack 54 have been processed, the storage and retrieval machine 90 begins to deliver to the P&D stations 231 (i.e., to the powered conveyor rollers 231) the trays from the opposite-side sweep rack 30 that have been placed in the staging rack 70.

At the same time trays are being delivered to the output P&D stations 231 for second pass processing, the storage and retrieval machine 90 is transferring trays from the input P&D station 214 to the staging rack 70. The control system continues to dispatch trays to the operator station one at a time in order of DBCS sequence number. These first pass trays are arriving on the input tray transport system 210 from the opposite-side sweep rack. The trays on the input tray transport system 210 are staged as soon as a location in the staging rack 70 is available. The trays on the input tray transport system 210 are in order as placed there by the sweep operator.

The bar code label 47 on the tray identifies a DBCS output stacker location. This data is scanned by the bar code scanner pair and stored in the control system database. This allows the control system to track the overflow trays which are staged by the storage and retrieval machine 90.

The sweep operator performs the same operations on second pass that were performed on the first pass. As trays are filled and overflows occur they are placed on the input tray transport system 210. The overflow trays are placed on the top level of the sweep racks if open windows are not available on the input tray transport system 210. These trays are moved to the input tray transport system 210 as soon as open positions are available.

All of the overflow trays from second pass processing are to be in the staging rack 70 before the mail is dispatched. The sweep operator verifies that all overflows have been placed on the input tray transport system 210, delivered to the input conveyor P&D station 214, and then staged in the staging rack 70.

The sweep operator completely sweeps all second pass mail from each DBCS output stacker 22 and places it in the corresponding tray at the sloped positions in the sweep racks 30 and 54. The operator then pushes all of the trays on the near-side sweep rack 54 onto the three output belts 226.

The trays in the opposite-side sweep rack 30 are placed on the input tray transport system 210 in sequence and delivered to the input P&D station 214. Because of the number of trays at the opposite-side sweep rack 30 it may be necessary to place only half of the trays on the input tray transport system 210. Placement of these trays in dispatch carts at the operator stations 233 will free the input tray transport system 210 to accept the remaining trays from the opposite-side sweep rack 30.

All of the trays to be dispatched are delivered directly to dispatch carts. Before dispatching the mail, all second pass overflow trays are in the staging rack 70, the three belts 226 hold the three levels of second pass trays inserted from the near-side sweep rack 54, and the input tray transport system 210 is completely full of second pass trays arriving from the opposite-side sweep rack 30.

When dispatch is started, the three belts 226 begin to deliver the trays to the three P&D stations 231. The trays are advanced onto the gravity rollers 233 and to the operator in the exact sequence corresponding to the first DBCS output stacker locations. The control system tracks the trays on the belts 226 and directs the storage and retrieval machine 90 to retrieve from the staging rack 70 any overflows to match the trays that are staged at the head or downstream ends of output belts 226. The storage and retrieval machine 90 delivers these overflow trays to one of the three sets of powered conveyor rollers 231. The control system commands the dispensing of trays from either the output belts 226 or the output P&D stations 231 whenever all of the operator stations 233 are determined to be empty. Only one tray at a time is indexed onto one of the three sets of rollers 233 for consistent sequencing of trays to the operator.

Once all of the trays on the three belts 226 have been delivered to the operator and loaded onto dispatch carts, the trays from the opposite-side sweep rack 30 are dispatched. These trays are loaded directly from the input tray transport system 210 onto dispatch carts via operator station 222. Overflows are brought out to match trays which are staged at the head or downstream end of the input tray transport system. The control system either dispatches from the lowest operator station 222 or delivers overflows to the operator stations 233.

Empty dispatch carts are used by the operators for loading the trays 46. The loaded dispatch carts go directly to the shipping dock. After all the trays are on carts and on the way to dispatch, the sweep racks are again staged with empty trays.

Figure 12:
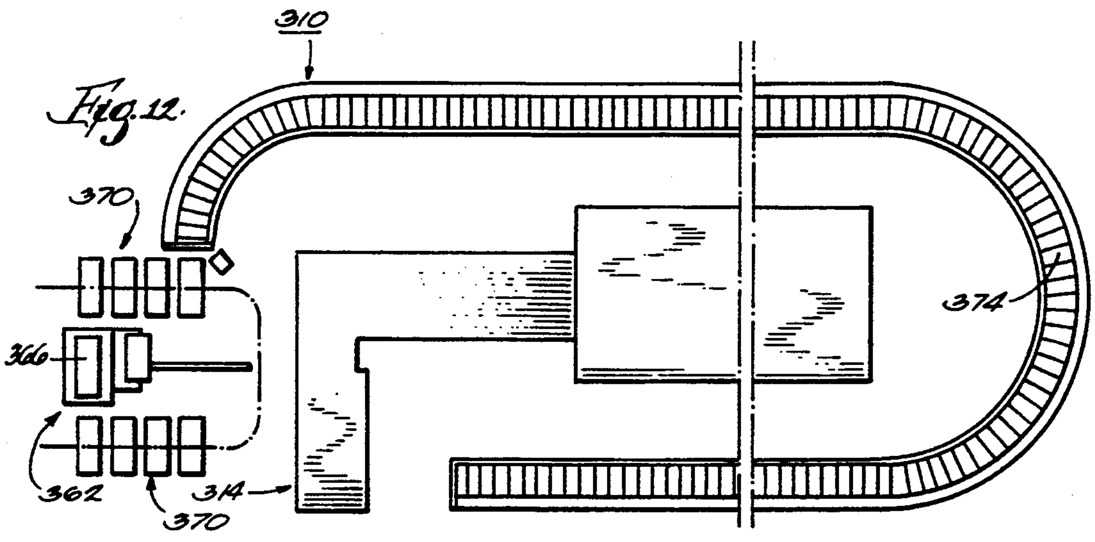
FIG. 12 is a top plan view of an alternative embodiment of the invention which includes a bar code sorter rather than a delivery bar code sorter.

An apparatus 310 which is an alternative embodiment of the invention and which includes a bar code sorter 314 rather than a delivery bar code sorter is shown in FIG. 12. The apparatus 310 comprises an automatic storage and retrieval system 362 including a storage and retrieval machine 366 and a staging rack 370 on each side of the storage and retrieval machine 366. Each rack 370 includes four bays of staging positions. The apparatus 310 also comprises a conveyor 374 between the bar code sorter 314 and the automatic storage and retrieval system 362.

Thus, the invention provides a letter sorting apparatus including a letter sorting machine and an automatic storage and retrieval system. It automatically stages letters sorted and dispensed by the letter sorting machine and that automatically stages letters for input into the letter sorting machine for sorting. The automatic storage and retrieval system includes one or more discrete storage rack modules each having standard shelves with continuous upwardly facing surfaces that define a plurality of staging or storage locations, and a storage and retrieval machine that is operable to store objects, such as letter trays, in and to retrieve objects from designated storage locations. Transporting means, such as a conveyor, is employed to feed objects to be stored to the storage and retrieval machine from temporary storage positions. In the particular embodiment described hereinafter, letters to be sorted by the letter sorting machine are staged by the storage and retrieval machine for input into the letter sorting machine, and, after sorting, are transported from the letter sorting machine into the storage and retrieval machine which thereafter stores the letters in and retrieves the letters from storage locations on the storage rack modules. The storage and retrieval machine includes a horizontally movable base, a vertical mast on the base, a vertically movable carriage supported on the mast, and an extractor that is generally inverted relative to prior art arrangements and that is operable to slide a load (i.e., a letter tray) onto and off of the carriage without exerting an upward force on the load. More particularly, the extractor includes an upper most plate member fixed on the carriage, and one or more successively lower plate members that are horizontally movable relative to the proceeding plate member thereabove. Suitable moving means, such as a motor, is provided to move the movable plate members between an extended position wherein the lower most plate member is positioned directly above an object in a storage location without interference from the shelves, and a retracted position wherein the movable plate members are vertically aligned within the carriage. The lower most plate member is provided with at least one hoop-like member selectively movable between a raised position and a lowered position wherein it is engageable with an object to be moved so that when the lower most plate member is extended or retracted the object is slid with it to move the object between the carriage and the desired storage location. One or more motors are provided for moving the hoop-like member.

Figure 13:
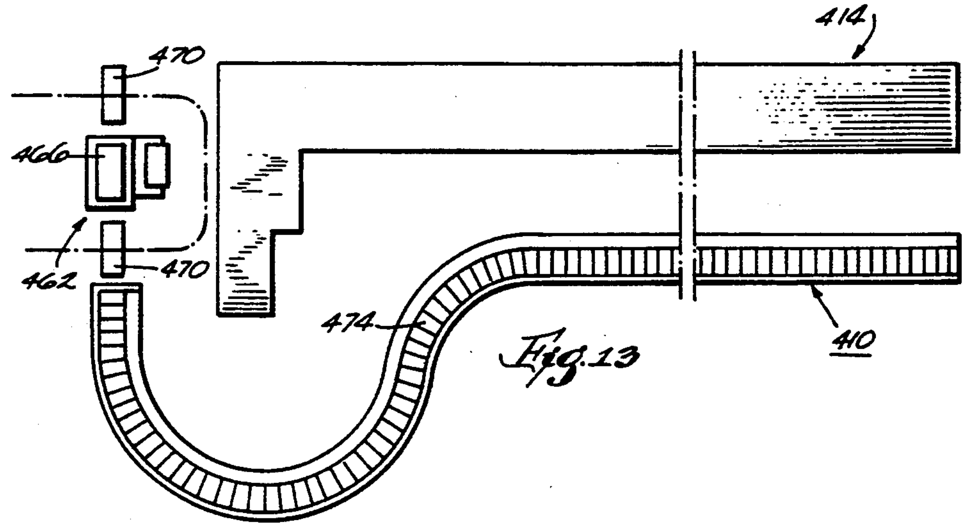
FIG. 13 is a top plan view of a second alternative embodiment of the invention which includes an optical character reader rather than a delivery bar code sorter.

An apparatus 410 which is an alternative embodiment of the invention and which includes an optical character reader 414 rather than a delivery bar code sorter is shown in FIG. 13. The apparatus 410 comprises an automatic storage and retrieval system 462 including a storage and retrieval machine 466 and a staging rack 470 on each side of the storage and retrieval machine 466. Each rack 470 includes one bay of staging positions, so that the mast of the storage and retrieval machine 466 does not have to move horizontally. The apparatus 410 also comprises a conveyor 474 between the optical character reader 414 and the automatic storage and retrieval system 462.

Figure 14:
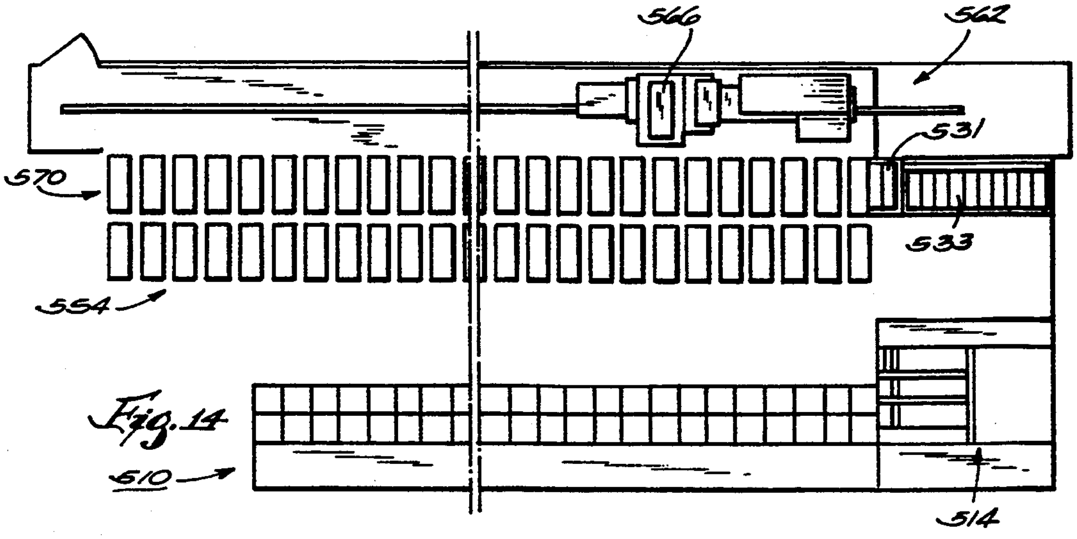
FIG. 14 is a top plan view of a third alternative embodiment of the invention which includes a one-sided delivery bar code sorter rather than a two-sided delivery bar code sorter.

An apparatus 510 which is an alternative embodiment of the invention and which includes a one-sided delivery bar code sorter 514 rather than a two-sided delivery bar code sorter is shown in FIG. 14. The apparatus 510 comprises a sweep rack 554 on the output side of the bar code sorter 514. The apparatus also comprises a storage and retrieval system 562 including a storage and retrieval machine 566 and a staging rack 570 on top of the sweep rack 554. The sweep rack 554 has therein belts (not shown) identical to the belts 210 and 226 of the apparatus 10, rollers (not shown) identical to the rollers 214 and 222 of the apparatus 10, and rollers 531 and 533 (one set is shown) identical to the rollers 231 and 233 of the apparatus 10.

An alternative extractor or shuttle mechanism 602 is illustrated in FIGS. 22–26. Except as described below, the shuttle mechanism 602 is identical to the shuttle mechanism 102, and common elements have been given the same reference numerals.

In the shuttle mechanism 602, the opposite ends of the hoop 186A are designated by reference numerals 604 and 606, and the opposite ends of the hoop 186B are designated by reference numerals 608 and 610. The end 604 of the hoop 186A has thereon (see FIG. 25) a downwardly extending pivot arm 612, and the end 608 of the hoop 186B has thereon an upwardly extending pivot arm 614. The end 606 of the hoop 186A has thereon (see FIG. 24) an upwardly extending pivot arm 116, and the end 610 of the hoop 186B has thereon a downwardly extending pivot arm 618.

In the shuttle mechanism 602, the means for moving the hoops 186 includes (see FIG. 25) a first link 620 extending between the pivot arms 612 and 614 (and thus between the hoops 186A and 186B). The means for moving the hoops 186 also includes (see FIG. 24) a second link 622 extending between the pivot arms 616 and 618 (and thus between the hoops 186A and 186B). Each of the links 620 and 622 is movable substantially longitudinally in opposite directions. The means for moving the hoops 186 also includes a motor 626 fixed against horizontal movement relative to the carriage 98. The motor 626 is preferably fixed to the upper plate 114. The motor 626 is preferably a reversible brake motor having (see FIG. 23) a horizontally extending output shaft 630 having opposite ends 632 and 634. The shaft end 632 has thereon (see FIG. 25) a downwardly extending lever arm 636, and the shaft end 634 has thereon (see FIG. 24) a downwardly extending lever arm 638. The means for moving the hoops 186 also includes means for drivingly connecting the motor 626 to the hoops 186. Such connecting means preferably includes a cable and pulley arrangement connecting the lever arm 636 to the link 620 and a cable and pulley arrangement connecting the lever arm 638 to the link 622.

Figure 25:
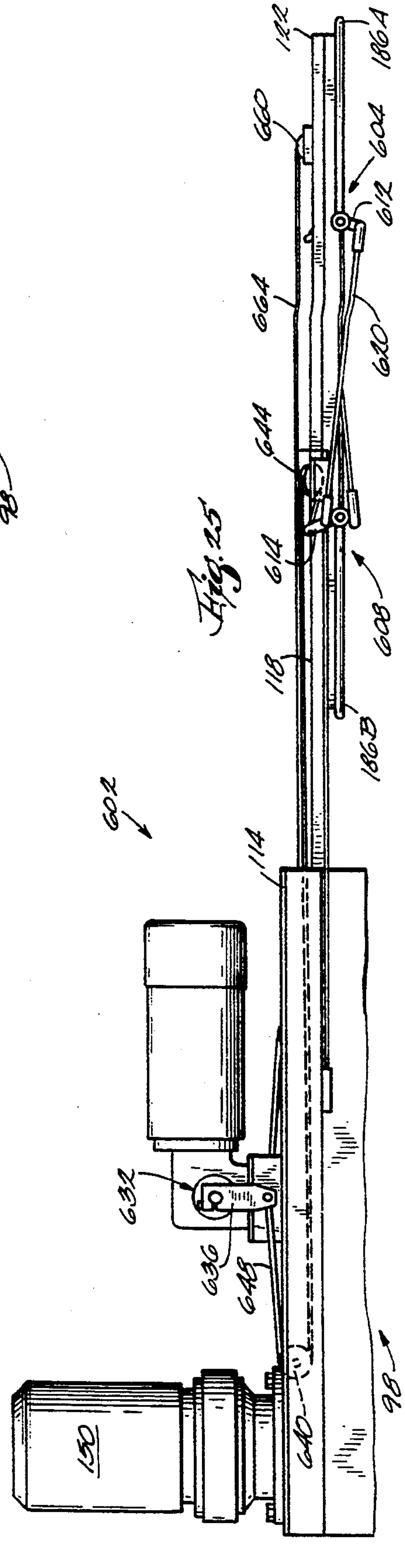
FIG. 25 is a view similar to FIG. 24 showing the opposite side of the extractor.
Figure 23:
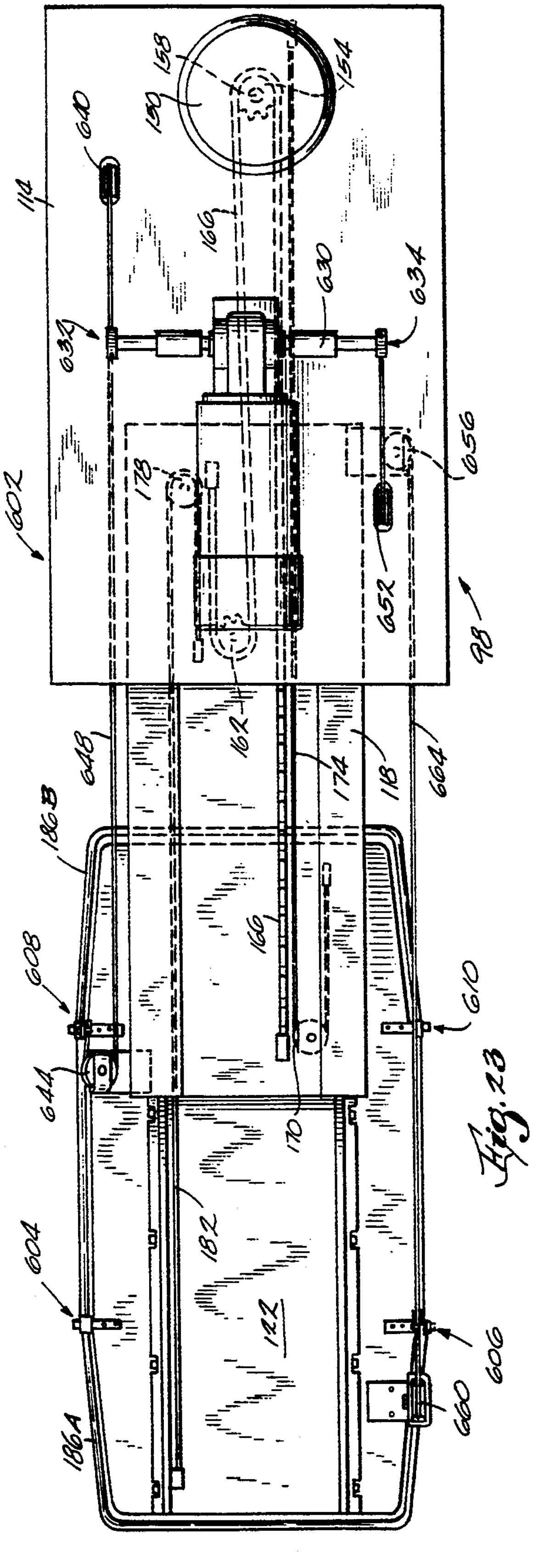
FIG. 23 is a top plan view of the carriage and extractor assembly shown in FIG. 22.
Figure 26:
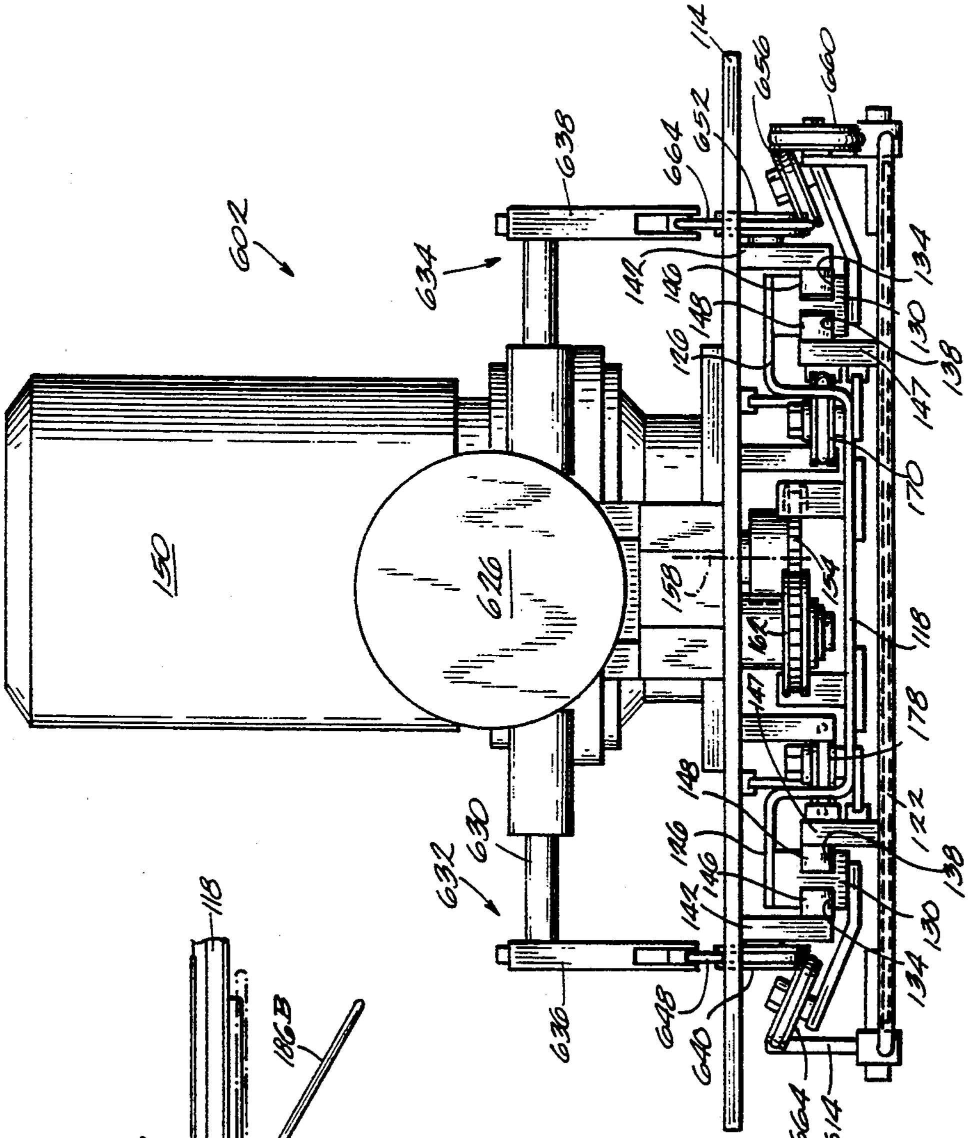
FIG. 26 is an end elevational view (from the left in FIG. 22) of the extractor in the retracted condition.

The cable and pulley arrangement connecting the lever arm 636 to the link 620 includes (see FIGS. 23 and 25) a pulley 640 pivotally mounted on the upper plate 114 and fixed against horizontal movement relative thereto, and a pulley 644 pivotally mounted on the intermediate plate 118 and fixed against horizontal movement relative thereto. The pulley 640 rotates in a vertical plane, and the pulley 644 rotates in a non-vertical and non-horizontal plane as best shown in FIG. 26. A cable 648 is trained over the pulleys 640 and 644 and has one end fixed to the lower end of the lever arm 636 and an opposite end fixed to the upper end of the pivot arm 614. As seen in FIG. 25, counterclockwise movement of the lever arm 636 acts through the cable 648 to cause clockwise movement of the pivot arm 614 and thereby pivots the hoops 186 to their upper positions.

Figure 24:
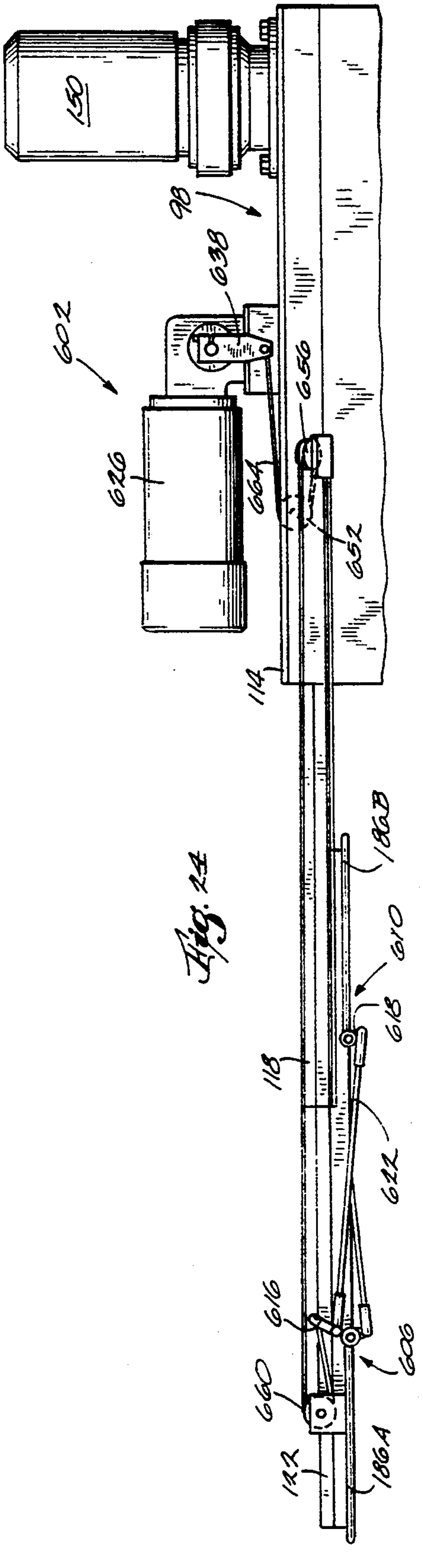
FIG. 24 is side elevational view of a portion of the carriage and extractor assembly shown in FIG. 22 but with the hoops raised.

The cable and pulley arrangement connecting the lever arm 638 to the link 622 includes (see FIGS. 23 and 24) a pulley 652 pivotally mounted on the upper plate 114 and fixed against horizontal movement relative thereto, a pulley 656 pivotally mounted on the intermediate plate 118 and fixed against horizontal movement relative thereto, and a pulley 660 pivotally mounted on the lower plate 122 and fixed against horizontal movement relative thereto. The pulleys 652 and 660 rotate in a vertical plane, and the pulley 656 rotates in a non-vertical and non-horizontal plane as best shown in FIG. 26. A cable 664 is trained over the pulleys 652, 656 and 660 and has one end fixed to the lower end of the lever arm 638 and an opposite end fixed to the upper end of the pivot arm 616. As seen in FIG. 24, counterclockwise movement of the lever arm 638 acts through the cable 664 to move the pivot arm 616 counterclockwise and thereby pivots the hoops 186 to their lower positions.

Figure 27:
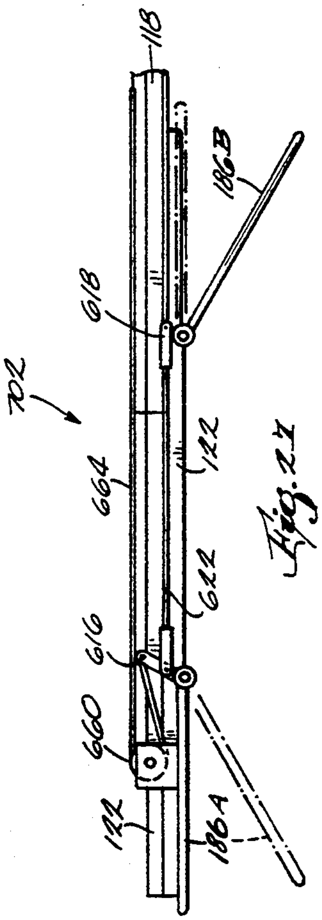
FIG. 27 is a partial side elevational view similar to FIG. 22 of a second alternative extractor construction shown with the extractor extended and only one of the hoops lowered.

A second alternative extractor or shuttle mechanism 702 is partially illustrated in FIG. 27. Except as described below, the shuttle mechanism 702 is identical to the shuttle mechanism 602, and common elements have been given the same reference numerals.

In the shuttle mechanism 702, the pivot arms 612, 614, 616 and 618 all extend upwardly so that longitudinal movement of either link 620 or 622 causes one of the hoops 186 to move to its upper position and causes the other hoop 186 to move to its lower position. For example, as seen in FIG. 27, counterclockwise movement of the lever arm 616 moves the hoop 186A to its lower position and moves the hoop 186B to its upper position.

Various features of the invention are set forth in the following claims.

We claim:

1. A storage and retrieval machine comprising a base adapted to move horizontally along a supporting surface, a generally vertical mast supported by said base, a carriage supported for generally vertical movement along said mast, said carriage including an upwardly facing surface, and an extendable and retractable shuttle mechanism supported by said carriage, said shuttle mechanism including an upper plate fixed against horizontal movement relative to said carriage, an intermediate plate which is located below said upper plate and which is supported by said upper plate for horizontal movement relative thereto, and a lower plate which is located below said intermediate plate and above said upwardly facing surface of said carriage and which is supported by said intermediate plate for horizontal movement relative thereto, said shuttle mechanism being operable between a retracted condition wherein said intermediate plate is located directly below said upper plate and said lower plate is located directly below said intermediate plate, and an extended condition wherein said intermediate plate extends outwardly in one direction relative to said upper plate and said lower plate extends outwardly in said one direction relative to said intermediate plate, said shuttle mechanism sliding objects onto and off said upwardly facing surface of said carriage.

2. A machine as set forth in claim 1 wherein said carriage includes means for moving said intermediate and lower plates relative to said upper plate.

3. A machine as set forth in claim 2 wherein said shuttle mechanism also includes means for supporting said intermediate plate for movement relative to said upper plate and for supporting said lower plate for movement relative to said intermediate plate, said supporting means including upper slides fixed relative to said upper plate, intermediate slides which are fixed relative to said intermediate plate and which slideably engage said upper slides, and lower slides which are fixed relative to said lower plate and which slideably engage said intermediate slides.

4. A storage and retrieval machine comprising a base adapted to move horizontally along a supporting surface, a generally vertical mast supported by said base, a carriage supported for generally vertical movement along said mast, and an extendable and retractable shuttle mechanism supported by said carriage, said shuttle mechanism including a plate movable horizontally relative to said carriage, said plate having opposite first and second sides, and an engaging mechanism on said plate for selectively engaging an object so that the object moves horizontally with said plate, said engaging mechanism including a member movable relative to said plate between an upper position and a lower position, said member being generally U-shaped and having a first end pivotally connected to said first side and a second end pivotally connected to said second side.

5. A machine as set forth in claim 1 wherein said shuttle mechanism includes means on said lower plate for selectively engaging an object beneath said lower plate so that the object moves horizontally with said lower plate.

6. A machine as set forth in claim 5 wherein said means for selectively engaging the object includes a member movable relative to said lower plate between an upper position and a lower position.

7. A machine as set forth in claim 6 wherein said means for selectively engaging the object also includes moving means for moving said member between said upper and lower positions, said moving means including a motor fixed relative to said lower plate.

8. A machine as set forth in claim 7 wherein said member pivots relative to said lower plate.

9. A machine as set forth in claim 8 wherein said lower plate has opposite first and second sides, and wherein said member is generally U-shaped and has a first end pivotally connected to said first side and a second end pivotally connected to said second side.

10. A machine as set forth in claim 9 wherein said member extends substantially parallel to said lower plate when said member is in said upper position and extends transversely and downwardly relative to said lower plate when said member is in said lower position.

11. A machine as set forth in claim 9 wherein said means for selectively engaging the object also includes a second generally U-shaped member pivotable relative to said lower plate between upper and lower positions, and wherein said U-shaped members extend adjacent opposite ends of the object when said members are in said lower positions.

12. A machine as set forth in claim 8 wherein said means for selectively engaging the object also includes a torsional solenoid fixed to said lower plate and drivingly connected to said member.

13. A machine as set forth in claim 12 wherein said solenoid is biased so as to bias said member to said upper position, and wherein actuation of said solenoid moves said member to said lower position.

14. A machine as set forth in claim 13 wherein said means for selectively engaging the object also includes means for selectively retaining said member in said lower position.

15. A machine as set forth in claim 14 wherein said retaining means includes a cam fixed to said member for pivotal movement therewith, and a linear solenoid having an outwardly biased plunger engaging said cam.

16. A machine as set forth in claim 15 wherein said cam includes a cam surface having a step, wherein said plunger engages said cam surface and falls off said step when said member moves from said upper position to said lower position, and wherein said plunger thereafter interferes with said step so as to prevent pivotal movement of said member toward said upper position.

17. A machine as set forth in claim 16 wherein actuation of said linear solenoid retracts said plunger so that said plunger does not interfere with said step and the bias of said torsional solenoid returns said member to said upper position.

18. A machine as set forth in claim 6 wherein said means for selectively engaging the object includes a motor fixed against horizontal movement relative to said carriage, and means for drivingly connecting said motor to said member.

19. A machine as set forth in claim 18 wherein said means for drivingly connecting said motor to said member includes a cable extending between said motor and said member.

20. A machine as set forth in claim 19 wherein said means for drivingly connecting said motor to said member also includes a pulley pivotably mounted on said intermediate plate, and wherein said cable is trained over said pulley.

21. A machine as set forth in claim 18 wherein said motor is fixed to said upper plate.

22. A machine as set forth in claim 5 wherein said means for selectively engaging the object includes first and second members movable relative to said lower plate between respective upper and lower positions.

23. A machine as set forth in claim 22 wherein said means for selectively engaging the object also includes means for simultaneously moving said first and second members to said upper positions and for simultaneously moving said first and second members to said lower positions.

24. A machine as set forth in claim 22 wherein said means for selectively engaging the object also includes means for moving said first member to said upper position when said second member moves to said lower position and for moving said first member to said lower position when said second member moves to said upper position.

25. A machine as set forth in claim 22 wherein said shuttle mechanism also includes moving means for moving said first and second members, said moving means including a first link which extends between said first and second members and which is movable in opposite directions, and a second link which extends between said first and second members and which is movable in opposite directions.

26. A machine as set forth in claim 25 wherein said moving means includes a motor fixed against horizontal movement relative to said carriage, a first cable extending between said motor and said first link for moving said first link in the direction moving said first member to said upper position, and a second cable extending between said motor and said second link for moving said second link in the direction moving said first member to said lower position.

27. A machine as set forth in claim 26 wherein said moving means also includes first and second pulleys pivotally mounted on said intermediate plate, wherein said first cable is trained over said first pulley, and wherein said second cable is trained over said second pulley.

28. A machine as set forth in claim 27 wherein said moving means also includes third and fourth pulleys pivotally mounted on said upper plate, wherein said first cable is trained over said third pulley, and wherein said second cable is trained over said fourth pulley.

29. A storage and retrieval machine comprising a base adapted to move horizontally along a supporting surface, a generally vertical mast supported by said base, a carriage supported for generally vertical movement along said mast, and a shuttle mechanism for extending above a load and sliding the load onto and off said carriage without exerting an upward force on the load.

30. A machine as set forth in claim 29 wherein said shuttle mechanism includes a plate which is movable relative to said carriage and which extends above the load, wherein said carriage includes an upwardly facing surface beneath said plate, and wherein said shuttle mechanism slides objects onto and off said upwardly facing surface.

31. A machine as set forth in claim 30 wherein said shuttle mechanism includes an engaging mechanism on said plate for selectively engaging an object beneath said plate so that the object moves horizontally with said plate.

32. A machine as set forth in claim 31 wherein said engaging mechanism includes a member movable relative to said plate between an upper position and a lower position.

33. A machine as set forth in claim 32 wherein said engaging mechanism also includes a motor fixed relative to said plate for moving said member between said upper and lower positions.

34. A machine as set forth in claim 33 wherein said member pivots relative to said plate.

35. A machine as set forth in claim 34 wherein said plate has opposite first and second sides, and wherein said member is generally U-shaped and has a first end pivotally connected to said first side and a second end pivotally connected to said second side.

36. A machine as set forth in claim 35 wherein said member extends substantially parallel to said plate when said member is in said upper position and extends transversely and downwardly relative to said plate when said member is in said lower position.

37. A machine as set forth in claim 35 wherein said engaging mechanism also includes a second generally U-shaped member pivotable relative to said lower plate between upper and lower positions, and wherein said U-shaped members extend adjacent opposite ends of the object when said members are in said lower positions.

38. A machine as set forth in claim 4 wherein said member extends substantially parallel to said plate when said member is in said upper position and extends transversely and downwardly relative to said plate when said member is in said lower position.

39. A machine as set forth in claim 4 wherein said engaging mechanism also includes a second generally U-shaped member pivotable relative to said plate between upper and lower positions, and wherein said U-shaped members extend adjacent opposite ends of the object when said members are in said lower positions.

40. A storage and retrieval machine comprising a base adapted to move horizontally along a supporting surface, a generally vertical mast supported by said base, a carriage supported for generally vertical movement along said mast, and an extendable and retractable shuttle mechanism supported by said carriage, said shuttle mechanism including a plate movable horizontally relative to said carriage, a first motor for moving said plate relative to said carriage, a member movable relative to said plate for engaging an object to be moved by said shuttle mechanism, and a second motor for moving said member relative to said plate, said second motor being fixed against horizontal movement relative to said carriage, and said second motor being drivingly connected to said member.

41. A machine as set forth in claim 40 wherein said motor is drivingly connected to said member by a cable extending between said motor and said member.

42. A machine as set forth in claim 41 wherein said shuttle mechanism also includes an intermediate plate relative to which said first-mentioned plate is movable, and a pulley pivotably mounted on said intermediate plate, and wherein said cable is trained over said pulley.

43. A machine as set forth in claim 41 wherein said shuttle mechanism also includes an upper plate relative to which said intermediate plate is movable, and wherein said motor is fixed to said upper plate.

44. A storage and retrieval machine comprising a base adapted to move horizontally along a supporting surface, a generally vertical mast supported by said base, a carriage supported for generally vertical movement along said mast, and an extendable and retractable shuttle mechanism supported by said carriage, said shuttle mechanism including a plate movable horizontally relative to said carriage, and an engaging mechanism on said plate for selectively engaging an object beneath said plate so that the object moves horizontally with said plate, said engaging mechanism including first and second members movable relative to said plate between respective upper and lower positions, a first link which extends between said first and second members and which is movable in opposite directions, and a second link which extends between said first and second members and which is movable in opposite directions.

45. A machine as set forth in claim 44 wherein said engaging mechanism also includes a motor fixed against horizontal movement relative to said carriage, a first cable extending between said motor and said first link for moving said first link in the direction moving said first member to said upper position, and a second cable extending between said motor and said second link for moving said second link in the direction moving said first member to said lower position.

46. A machine as set forth in claim 45 wherein said shuttle mechanism also includes an intermediate plate relative to which said first-mentioned plate is movable, wherein said engaging mechanism also includes first and second pulleys pivotally mounted on said intermediate plate, wherein said first cable is trained over said first pulley, and wherein said second cable is trained over said second pulley.

47. A machine as set forth in claim 46 wherein said shuttle mechanism also includes an upper plate relative to which said intermediate plate is movable, wherein said engaging mechanism also includes third and fourth pulleys pivotally mounted on said upper plate, wherein said first cable is trained over said third pulley, and wherein said second cable is trained over said fourth pulley.

* * * * *